United States Patent
Pai et al.

(10) Patent No.: US 8,577,392 B1
(45) Date of Patent: Nov. 5, 2013

(54) SYSTEM AND METHOD OF DETERMINING LOCATION OF WIRELESS COMMUNICATION DEVICES/PERSONS FOR CONTROLLING/ADJUSTING OPERATION OF DEVICES BASED ON THE LOCATION

(75) Inventors: Raghunandan K. Pai, Cupertino, CA (US); Timothy S. Hurley, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 43 days.

(21) Appl. No.: 13/495,497

(22) Filed: Jun. 13, 2012

(51) Int. Cl.
*H04W 24/00* (2009.01)

(52) U.S. Cl.
USPC ............. 455/456.3; 455/404.2; 455/420; 455/552.1; 455/456.1; 455/456.2; 455/422.1

(58) Field of Classification Search
USPC ........ 455/550.1, 552.1, 556.1–557, 418–420, 455/151.2, 151.4, 352, 353, 41.2, 422.1, 455/421, 404.2; 340/539.13, 539.21, 340/825.69, 825.72, 7.55
See application file for complete search history.

(56) References Cited

U.S. PATENT DOCUMENTS

| 7,155,305 B2 | 12/2006 | Hayes et al. | |
| 2002/0147006 A1 | 10/2002 | Coon et al. | |
| 2006/0058039 A1* | 3/2006 | Irvin et al. | 455/456.1 |
| 2006/0099971 A1* | 5/2006 | Staton et al. | 455/456.6 |
| 2008/0181172 A1* | 7/2008 | Angelhag et al. | 370/328 |
| 2008/0200182 A1* | 8/2008 | Shim | 455/456.1 |
| 2011/0202181 A1 | 8/2011 | Lee et al. | |
| 2011/0202185 A1 | 8/2011 | Imes et al. | |
| 2011/0231020 A1 | 9/2011 | Ramachandran et al. | |

FOREIGN PATENT DOCUMENTS

| EP | 1585078 A2 | 10/2005 |
| EP | 2247126 A2 | 11/2010 |
| WO | 2010/053362 A1 | 5/2010 |

OTHER PUBLICATIONS

European Search Report mailed Aug. 1, 2013 in EP 13171446, 7 pages.

* cited by examiner

*Primary Examiner* — Vladimir Magloire
*Assistant Examiner* — Babar Sarwar
(74) *Attorney, Agent, or Firm* — Kilpatrick Townsend & Stockton, LLP

(57) ABSTRACT

One or more relay servers can access first data received from one or more first devices (e.g., a phone, tablet computer, vehicle tracking device, or badge reader). The one or more relay servers can aggregate the data and infer a location of a person. The one or more relay servers can transmit second signals including second data to one or more second devices (e.g., lighting systems, security systems, garage-door openers, music controllers, climate controllers, or kitchen appliances), the second data being based at least in part on the estimated location. The second-signal transmission can be pushed to the second devices or pulled by the second devices. Operations of the second devices can be controlled at least in part on the second data.

27 Claims, 8 Drawing Sheets

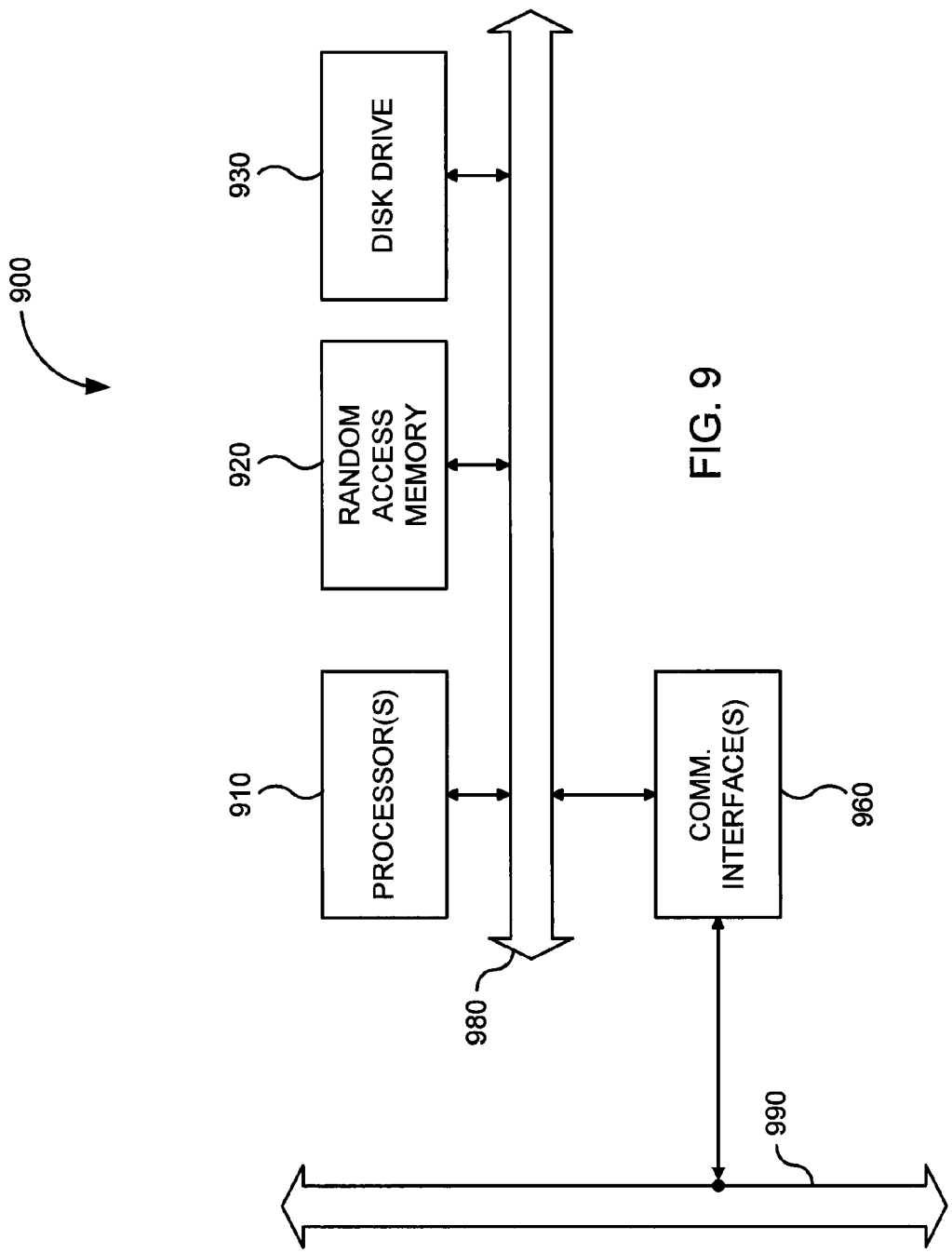

SYSTEM AND METHOD OF DETERMINING LOCATION OF WIRELESS COMMUNICATION DEVICES/PERSONS FOR CONTROLLING/ADJUSTING OPERATION OF DEVICES BASED ON THE LOCATION

BACKGROUND

The present disclosure relates generally to inferring a person's location based on communications received from one or more transmitting devices, and propagating data related to the inferred location to one or more receiving devices.

Traditionally, people control the power state and operation of many household electronic devices. For example, a person can turn on an oven, turn on lights, adjust a stereo's volume setting, or open a garage door. Manual operations of these devices can allow for enhanced use flexibility, such that a person can precisely control when, e.g., a device is turned on. However, repeated manual operations can be tedious, and people can forget to optimally adjust device controls.

Manual operation of some devices has recently been replaced with automatic operations. For example, a person can set a schedule controlling the heating or cooling of his house. The automatic operations of devices free people from needing to repeatedly adjust device controls. Further, a device can be adjusted to a setting such that the device is at the desired state at a desired time. For example, an oven can be pre-heated before dinner time. However, automatic operations are frequently sub-optimal due to variations in a person's daily routines. A person can leave work at different times each day, can encounter different traffic patterns, or can exhibit different hunger levels. Thus, unpredictable events and emotions can make it difficult to establish automatic operations that consistently produce desired results.

SUMMARY

According to various embodiments of the present invention, a relay server can obtain information indicative of a person's current or future location from transmitting device(s), infer a current or future location from the data, and provide the inferred location to receiving device(s). For example, one or more relay servers can access first data received from one or more first devices (e.g., a phone, tablet computer, vehicle tracking device, badge reader, or one or more transmitting servers associated with a service, such as an email service, social networking service, calendar service, application execution, or messaging service). The one or more relay servers can infer a location of a person. In certain embodiments, the one or more relay servers dynamically weight and aggregate the first data to infer the location. One or more second devices (e.g., lighting systems, security systems, garage-door openers, music controllers, climate controllers, or kitchen appliances.) can receive second data from the one or more relay servers, and their operations can be controlled based on the second data.

In some embodiments, the one or more relay servers or the second devices apply location-related rules to the inferred location and identify second-device settings. In embodiments in which the one or more relay servers identify the receiving-device settings, the second data can include the settings. In embodiments in which the one or more second devices identify the receiving-device settings, the second data can indicate the inferred location, or a distance from the relay servers.

These and other embodiments of the invention along with many of its advantages and features are described in more detail in conjunction with the text below and attached figures.

BRIEF DESCRIPTION OF THE DRAWINGS

FIG. 9 illustrates an exemplary computer system that can be used according to an embodiment of the present invention.

DETAILED DESCRIPTION

Figure 1:
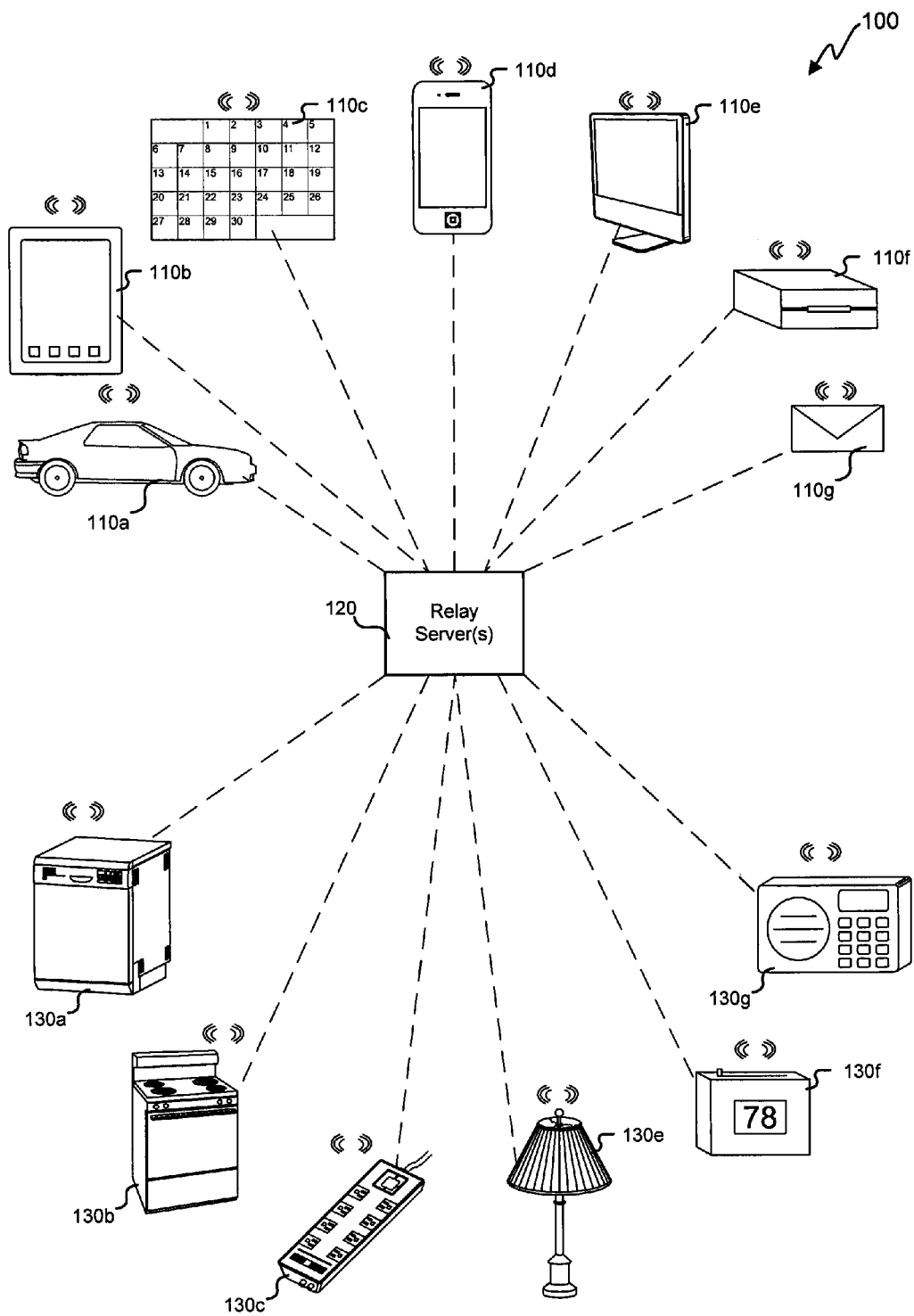
FIG. 1 illustrates a system in which a relay server receives first data from one or more first devices according to an embodiment of the present invention.

According to various embodiments of the present invention, one or more relay servers can access first data received from and/or collected by one or more first devices (e.g., a phone, tablet computer, vehicle tracking device, badge reader, or one or more transmitting servers associated with a service, such as an email service, social networking service, calendar service, application execution, or messaging service). In some embodiments, one, some or all of the first devices are instructed to send (or push) data to the one or more relay servers upon satisfaction of particular conditions. For example, a phone can transmit a location signal every time that its communications are routed to a new cell tower, a badge reader can transmit a detection signal each time that a particular badge is scanned, or a server associated with a calendar service can transmit an event signal each time an event is scheduled to begin.

The one or more relay servers can process the first data. For example, the one or more relay servers can weight portions of the first data based on, e.g., plausibility of a location associated with each portion, consistency of associated locations across multiple portions, consistency of locations associated with one or more portions across time, or confidence in specific devices. Raw or processed first data received within a time window can then be aggregated. For example, the one or more relay servers can receive signals including first data from ten devices within a ten-minute time span. The one or more relay servers can determine separate estimates of a location of a person (or of people) based on the first data in each signal and can then aggregate the estimates (i.e., selecting a single estimate, selecting multiple plausible estimates, or identifying a range of possible locations).

The one or more relay servers can transmit second signals including second data to one or more second devices (e.g., lighting systems, security systems, garage-door openers, music controllers, climate controllers, or kitchen appliance). In some instances, signals including different second data are transmitted to different second devices. For example, a garage-door opener can receive a second signal with second data indicating that a person is estimated to be on a home street, a lighting system can receive a second signal with second data indicating that a person is in a garage, or a music controller can receive a second signal with second data indicating that it should turn on based on a server-side location-based rule. The type of second data can vary across embodiments, particular second devices, or associated location estimations. For example, the second data can include an estimate of an absolute location (e.g., GPS coordinates, zip code, or street), an estimate of a qualitative location (e.g., at work or in a home garage), an indication as to whether one or more location criteria are satisfied (e.g., the person is within one mile from home or the person will be home in 15 minutes) or a control setting based on applying a location-based rule (e.g., turn on the home heater since the person is leaving work or turn on the dishwasher since the person is leaving home). Depending on the type of second data in transmitted second signals, various degrees of processing (e.g., determining whether a location criterion is satisfied, identifying control settings based on application of a location-based rule) can be performed at the one or more second devices as opposed to the one or more relay servers.

The one or more relay servers can act as a central entity, capable of receiving first data from many first devices and transmitting second data to many second devices. Thus, the one or more relay servers can determine an estimate of a person's location based on a rich set of inter-device information. Additionally, a number of second devices can receive information about a person's location without each second device individually communicating with first devices. Power and processing usage can thus be conserved for both first and second devices.

Various embodiments of the invention have the potential to intelligently and efficiently control devices based on an estimated location of one or more people. As compared to frequent transmissions from first devices or blind data requests (or pulls) from a relay server, conditioned transmissions of signals from first devices can, e.g., reduce power demands on the first devices (e.g., reducing the strain on a phone's battery) and reduce or eliminate duplicative processing by the relay server(s) and second device(s). Integrative processing performed at the one or more relay servers can improve an accuracy of a location estimation. For example, one device (e.g., a mobile phone) can indicate where a person is and another device (e.g., a GPS system in a car) can indicate where a person is likely going. As another example, even if one device is not transmitting signals (e.g., because the device is powered off or broken), a location can still be estimated based on data from other devices. Application of location-based rules allows second devices to operate intelligently. For example, settings can be pre-emptively adjusted such that a second device is in a desired state (e.g., pre-heated or ready for operation) at a time that a person wishes to use the device. Meanwhile, by strategically timing the implementation of the settings, energy usage by the second devices can be reduced (e.g., as opposed to keeping devices powered on at all times).

FIG. 1 illustrates a system 100 in which a relay server 120 receives one or more first signals including first data from one or more first devices 110. The relay servers 120 can subsequently transmit one or more second signals including second data to one or more second devices 130, the second data being based on the first data and relating to an estimated location of a person associated with the first data. One, more or all first devices 110 can be mobile and/or electronic. One, more or all second devices 130 can be immobile and/or electronic. In some instances, relay server 120 and/or one, more or all second devices 130 are located in a same building or land plot (e.g., a residential land plot, office building or home).

Various first devices can transmit first signals including first data to relay server 120. The first data can include, e.g., device activity, user inputs, power states, actual or estimated device locations, a location of one or more events (e.g., meetings, social gatherings, or concerts), raw data relevant to device-location estimations, object detections, and/or time stamps. In some instances, the first data includes an estimated location of a person, e.g., based on one or more of these variable values.

First devices 110 can include one or more portable computing devices. Portable computing devices can include any portable computing device with a wireless interface, such as a laptop computer, a tablet device, a key fob, a car key, an access card, a multi-function device, a mobile phone, a portable gaming device, a portable multimedia player, a portable music player, a personal digital assistant (PDA), a household device, and/or any portable or non-portable electronic or electro-mechanical device and/or the like. For example, a first device 110 can be an iPod®, iPhone®, or iPad® device available from Apple Inc. of Cupertino, Calif. In some instances, a first device 110 includes a sensor (e.g., camera and/or microphone), such that facial or voice recognition can be performed at first device 110 or at relay server 120. The detection, e.g., of a user's face in front of a desktop computer associated with a fixed location can indicate a location of the user.

Exemplary first devices 110 are shown in FIG. 1, and exemplary transmitted first data types are described. A vehicle accessory 110a can identify and transmit a signal with a location of a vehicle. For example, the vehicle accessory 110a can include a vehicle-integrated or mounted GPS unit. The signal can indicate, e.g., the current location, current motion and/or a programmed destination to which the GPS unit is navigating. A portable computer 110b, such as a laptop or tablet computer, can estimate its own location, e.g., based on an integrated GPS chip or Wi-Fi analysis, and transmit a signal with the estimated location. A server 110c associated with a calendar service can transmit a signal with information relating to past, current or future scheduled events (appointments or meetings) or tasks. A mobile phone 110d can estimate its location and transmit a signal with its estimated location. The estimation can be, e.g., based on an integrated GPS chip, Wi-Fi analysis, or cell-tower communications.

A desktop computer 110e can be associated with a fixed location and can transmit a signal with information relating to its location, activity or inactivity, user logins, or changes in power states. A card reader 110f or server associated with a card-reading system can transmit a signal with information about when and/or where a particular card was detected. For example, a server can transmit a signal with information about where and when a person's credit card was used, or a badge reader or other security checkpoint (e.g., at a fixed location) can transmit information about when a person's badge was scanned or when the person passed through the checkpoint. A server 110g associated with an electronic account (e.g., an email account) of a person can transmit a signal with information identifying a time of one or more actions (e.g., logging in or account activity) and/or location information associated with the actions (e.g., an IP address or a location associated with a server receiving user actions).

Some first devices 110 can include Bluetooth technology and can detect other nearby Bluetooth-enabled devices. These first devices 110 can transmit a signal with information identifying a detection of a nearby Bluetooth-enabled device and an identity of the nearby Bluetooth-enabled device. For example, desktop computer 110e can transmit a signal indicating that it has detected that mobile phone 110d is nearby. These first devices 110 can thus capitalize on location-detecting devices present in nearby Bluetooth-enabled devices but locally absent. For example, mobile phone 110d can include a GPS receiver, while desktop computer 110e may not. An absolute location of desktop computer 110e can nonetheless be estimated based on GPS data received at mobile phone 110d following Bluetooth detection.

System 100 can be configured such that relay-server information is accessible to first devices 110 indicating a destination for communications (i.e., an identifying characteristic of relay server 120). The relay-server information can include, e.g., an IP address, electronic address or server name. The relay-server information can be received by first devices 110 via, e.g., manual input by a user, electronic transmission from related devices, requests for data from relay server 120, or implementation of a search algorithm.

In some embodiments, first devices 110 transmit first signals including first data, e.g., the transmissions being substantially continuously or regularly. For example, first devices 110 can transmit first signals including updated first data at least, about, or less than about every 1 minute, 3 minutes, 5 minutes, 15 minutes, 30 minutes, 1 hour, 3 hours, 6 hours, 12 hours, or 24 hours. In some embodiments, first devices 110 transmit first signals upon receiving or processing a request for the data (e.g., from relay server 120).

In some embodiments, first devices 110 transmit first signals upon satisfaction of one or more conditions, such as changes with respect to a most-recent transmission, detection of particular occurrences, user activity, or upcoming or current events. Examples of changes with respect to a most-recent transmission include a location change having a magnitude above a threshold (e.g., 1 mile), a qualitative location change (e.g., a change in which cell tower is communicating with a device), or a change in a device state (e.g., a power state, activity state, or logged-in state). Examples of particular occurrences that can be detected include detections of a person's badge, detection of use of a credit card, or detection of a start of a vehicle. Examples of user activity are receipt of user input after an inactive period, receipt of at least one user input within a time period (e.g., 1 minute, 5 minutes or 10 minutes), or receipt of an input (e.g., a GPS destination, a new calendar event, closing a particular application). Examples of upcoming or current events are events on a calendar scheduled at a current time or a time less than a threshold time period in the future (e.g., scheduled to begin within the next 2 hours, 1 hour, 30 minutes, or 15 minutes).

While frequent transmissions of the first data can improve location estimations, they can also require significant power from first devices 110. Limiting the frequency of transmissions, based on defined transmission intervals or transmission conditions, can reduce power requirements. Further, condition-based transmissions have the potential to reduce or minimize any potential detriment to location estimations. For example, if conditions are set to avoid transmissions when a device is stationary, remote server 120 can assume that the device is in a same location as identified in a previous transmission (or that no new events of interest have occurred) even though no data is received explicitly identifying this circumstance.

In some embodiments, a first signal including first data can be sent from each first device 110 of one or more first devices 110 at substantially a same time. For example, first devices 110 can transmit first data at same absolute times (e.g., the top of every hour); first devices 110 satisfying one or more general or device-specific condition can transmit first data at same absolute times; or first devices 110 can respond to data requests from relay server 120 sent substantially simultaneously to one, more or all first devices. In some embodiments, first signals including first data can be sent from each first device 110 of one or more first devices 110 at different times. For example, first devices 110 can regularly transmit first signals but at different absolute times (e.g., at different frequencies and/or offsets); first devices 110 can transmit first signals upon satisfaction of different conditions; or first devices 110 can respond to data requests from relay server 120 sent to the devices at different times.

In various embodiments, different degrees of processing can be performed by first devices 110 as opposed to relay server 120. For example, processing such as identifying an absolute location based on cell-tower assignments, Wi-Fi signals, IP addresses, motion extrapolation, or calendar-event analysis can be performed by first devices 110 or relay server 120. As another example, processing such as identifying a location relative to a base location (e.g., home, a location of relay server 120 or a location of one or more second devices 130) can be performed by first devices 110 or relay server 120. Thus, the first signals transmitted by first devices 110 can include raw (unprocessed) data or processed data.

Relay server 120 can weight, aggregate and/or reduce a dimensionality of the first data in first signals received from first devices 110. Weights assigned to particular portions of the first data (e.g., associated with one or more particular first devices 110) can be static or dynamic. Factors that can influence the weights include: confidence that the data relates to a particular person, how informative the data is with regard to where a person is, how informative the data is with regard to where a person is going, empirical or current consistency associated with the data (e.g., with respect to other portions of data), settings (e.g., input by a person at a first device 110 or relay server 120), or potential consequence associated with the data. For example, higher weights can be assigned to data received from phone 110d if an empirical analysis indicates that the data provides consistently accurate estimations as to a person's location, or lower weights can be assigned to data received from a server 110g associated with an electronic account when the data identifies a location inconsistent with other simultaneously received or previously received data (e.g., identifying a location in a foreign country).

The first data can be aggregated, such that independent first data associated with each first device 110 is coalesced into a richer data set based on data received from multiple first devices. The aggregation can result in a dimensionality reduction. The aggregation can be performed across originating first devices 110 and/or across time periods. In one instance, recent data received from multiple first devices are aggregated. The recent data can include the last-received data (e.g., signals transmitted from a device), or the last-received data received within a particular time period (e.g., the most recent received data so long as it was not received more than 12 hours ago). In one instance, data received from a particular first device 110 are aggregated across time to allow for, e.g., noise-reducing filtering, reliability assessments, or data extrapolations.

The relay server 120 can estimate one or more locations based on the aggregated data. The estimated locations can include an estimated current or future location of a person associated with first devices 110. The locations can be estimated, e.g., based on locations of one or more first devices 110 (e.g., vehicle accessory 110*a*, portable computer 110*b*, or mobile phone 110*d*), detection of activity on a stationary device (e.g., desktop computer 110*c*, located, e.g., in a workplace), detection of a user-associated object by a stationary device (e.g., card reader 110*f*), tracking (e.g., by server 110*g* associated with an electronic account) account-related user activity, and/or scheduled events (e.g., identified by server 110*c* associated with a calendar service). For example, it can be inferred that a user is at work if his tablet computer, cellular phone, and car are at a work location, his badge was detected by a work badge detector in the morning, he is actively entering inputs into a desktop computer at the work location, and recent accesses to his email accounts trace back to IP addresses associated with his workplace.

The one or more locations can be absolute or relative (e.g., to a base location). The one or more locations can include, e.g., GPS coordinates, a street, a city, a zip code, a distance from a base location, or a presence in a location zone (e.g., a zone defined by a 5-mile radius centered on a base location; a "work" zone). The one or more locations can be associated with one or more rules. For example, if a rule indicates that a setting of the second device 130 changes when a person is within a particular location zone, one of the identified locations can relate to whether the person is within the particular location zone.

One or more second signals including second data, which is dependent on at least one estimated location, is transmitted from relay server 120 to one or more second devices 130. The second data can include, e.g., the at least one estimated location, an estimated desired use time of the one or more second devices 130 based on the estimated location, or a setting of the one or more second devices 130 determined by applying a rule to the estimated location.

In some embodiments, relay server 120 transmits (or pushes) the second signal with updated second data, e.g., continuously or regularly. For example, relay server 120 can transmit second data at least, about, or less than about every 1 minute, 3 minutes, 5 minutes, 15 minutes, 30 minutes, 1 hour, 3 hours, 6 hours, 12 hours, or 24 hours. In some embodiments, relay server 120 transmits a second signal upon receiving or processing a request for the second data (e.g., from one or more second devices 130). In some embodiments, relay server 120 transmits (or pushes) second data upon satisfaction of one or more conditions, such as estimating a new location (e.g., crossing a location boundary or into a new location zone) or identifying a new setting for a second device 130 based on the estimated location.

Various second devices can receive one or more second signals from relay server 120. The received second signals can be received as a result of relay server 120 pushing the second signals or second devices 130 pulling for information. Across embodiments or within a single embodiment but across second devices 130, second devices 130 can receive one or more second signals including a variety of types of second data, perform various degrees and types of processing of the second data, and adjust different types of operations based on the second data. Exemplary second devices 130 are shown in FIG. 1, and exemplary location-dependent operations are described.

A second device 130 can include a machine that is conveniently operated while a person is away, such as a dishwasher 130*a*. Thus, a person can avoid hearing noise of the machine or being otherwise affected by the machine's utility demands. A person can, in some instances, set a setting on dishwasher 130*a* (or another device) that indicates dishwasher 130*a* is to change its operation state (e.g., to turn on) after the person leaves the house. For example, a user can push a button on a panel of dishwasher 130*a* that indicates it is to turn on upon a next detection that the person has left the house.

A second device 130 can include a machine that is preferably conditioned prior to use, such as an oven 130*b*. The machine can conditioned (e.g., preheated) such that it is ready for use as soon as a person wishes to use it.

A second device 130 can include a power controller, such as a power-controlling circuit or current-distributing device (e.g., a power strip 130*c*). Electronic devices frequently draw power even when they are not in use, and person can reduce this excessive power drain by disabling power supplies to at least some outlets while the person is not nearby.

A second device 130 can include a lighting system or light 130*d*. This can allow select, most or all lights within a building, residence, office, or room to be turned off upon determining that a person is estimated to have left the associated area. Select lights can also be turned on prior to a person entering the associated area, such that, e.g., an entry-way light is on when a person walks through a front door.

A second device 130 can include a device 130*e* associated with a climate-control system. The climate-control system can be adjusted to reduce energy demands when a person is estimated to have left an area (e.g., raising a desired cooling temperature or lowering a desired heating temperature). Additionally, the climate-control system can be adjusted to return an area to a comfortable temperature for a time when a person is expected to arrive back to the area.

A second device 130 can include a device 130*f* associated with a security system. The security system can be activated upon departure of a person and de-activated just prior to return of the person. Various security features can also be adjusted based on other location estimates. For example, default security features can be activated while a person is estimated to be at work, and enhanced security features can be activated while a person is estimated to be on vacation. Security features can include, e.g., door locks, alarms, motion sensors, or security cameras.

Other examples of second devices 130 include, e.g., garage-door openers, sprinkler systems, television-recording systems, or music players. Second devices 130 can include electronic devices and/or any other device for which different types of operation are desired based on whether a person is nearby or not. Second devices 130 can include devices associated with and/or located within a residence (e.g., a home), a professional setting (e.g., an office), and/or a vehicle (e.g., a car). One, more or all second devices 130 can be portable. One, more or all second devices 130 can be practically non-portable (e.g., such as an oven or washing machine). In some embodiments, one or more second devices 130 are also a first device 110. For example, a portable computer can transmit data about its location and can also receive data identifying an estimated location of a person (based on an integrative analysis of data received from multiple devices). In some embodiments, none of second devices 130 are also a first device 110.

First devices 110 can communicate, e.g., wirelessly, with relay server 120 over a network, such as the Internet. Relay server 120 can communicate, e.g., wirelessly, with second devices 130. The communication with second devices can be over a network, such as the Internet or a Local Area Network and/or via Bluetooth LE or Bluetooth connection. In some instances, relay server 120 is physically coupled to one or more of the second devices 130. Thus, one or more first devices 110 and/or one or more second devices 130 can include a wireless receiver and/or transmitter, an Ethernet port, a wireless card, or a USB connector.

It will be further appreciated that configurations shown in FIG. 1 and/or described in associated disclosures are illustrative and that variations and modifications are possible. For example, rather than estimating a location of one person, locations of multiple people can be estimated. In these instances, the first devices 110 can include multiple devices of a same type (e.g., mobile phones associated with different people). As another example, with respect to disclosures herein, it will be understood that disclosures of "a relay server" can, in some embodiments, instead relate to a set of relay servers and "a set of relay servers" can, in some embodiments, instead relate to a relay server.

Figure 2:
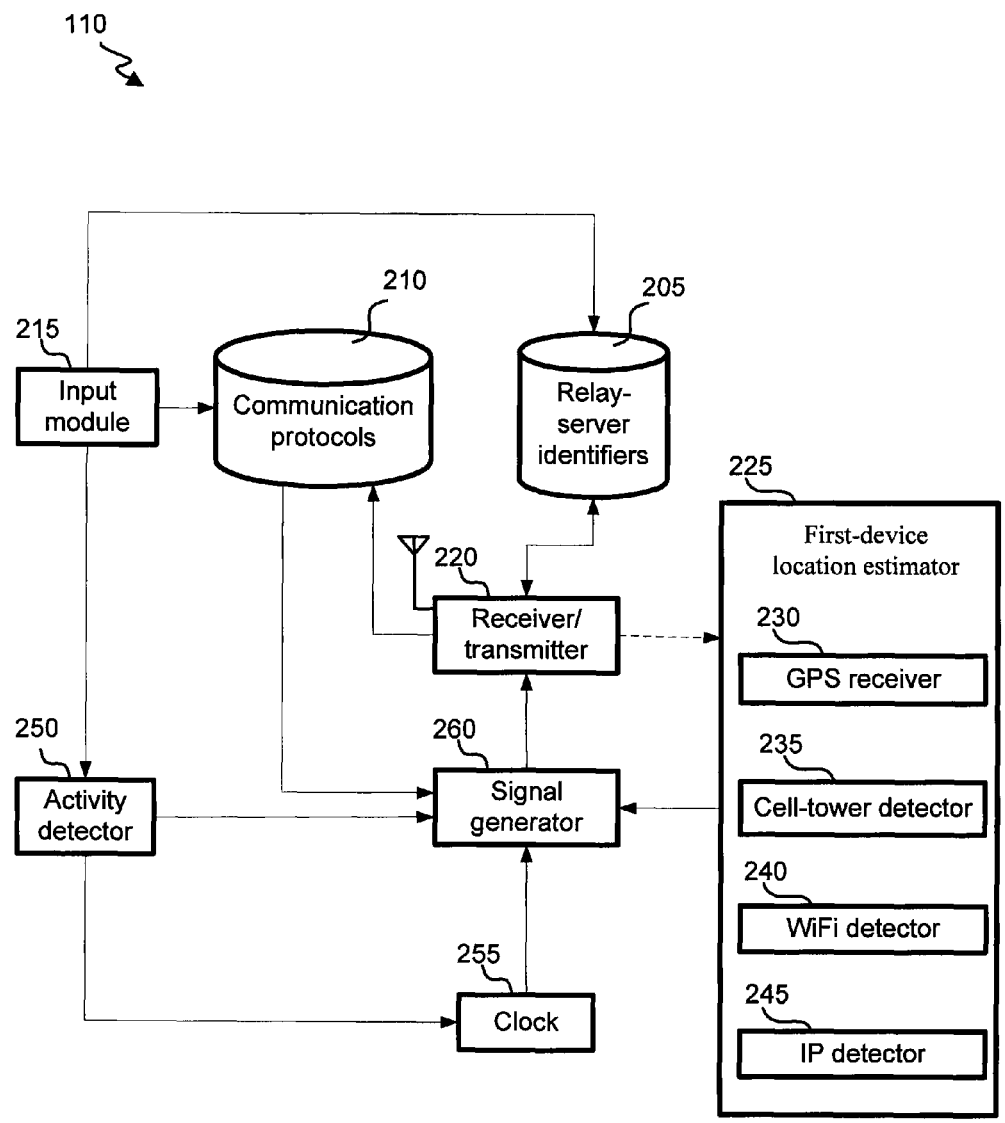
FIG. 2 illustrates an exemplary first device that can transmit signals to a relay server according to an embodiment of the present invention.

FIG. 2 is a block diagram showing an exemplary first device 110. First device 110 can include a storage module, which can include one or more databases and stored data. For example, one or more relay-server identifiers 205 can be stored. Relay-server identifiers 205 can identify properties (e.g., identifying properties) pertaining to one or more relay servers to which communications from first device 110 are to be transmitted. In some instances, a set of relay-server identifiers 205 are stored, as a first device 110 may communicate with multiple relay servers (e.g., one at work and one at home). Relay-server identifiers 205 can include, e.g., an IP address, a server name, an account name or address, a physical path, or a network path.

One or more communication protocols 210 can also be stored. Communication protocols 210 can indicate a type of signal, a communication schedule, a communication condition, data format, or requested communication content. For example, a communication protocol 210 can indicate that first device 110 is to transmit a communication to a relay server every 10 minutes, that the communication is to be communicated over the Internet, that the communication is to identify an estimated location of first device 110, and that the communication is not to be sent if the estimated location is the same as that sent in a most recent communication.

In some embodiments, one, some or all of relay-server identifiers 205 and/or communication protocols 210 are received from a user via an input module 215. Input module 215 can be implemented as a touch screen (e.g., LCD based touch screen), a voice command system, a keyboard, a computer mouse, a trackball, a wireless remote, a button, and/or the like. Input module 215 can allow a user to provide inputs to establish relay-server identifiers 205 and/or communications protocols 210 or to otherwise interact with first device 110. In some embodiments, input module 215 includes or is coupled to a display module (not shown). For example, first device 110 can include an LCD-based touch screen that displays images and also captures user input. Illustratively, a user can tap his or her finger on a region of the touch screen's surface that displays an icon. The touch screen can capture the tap and, in response, start a software program associated with the icon. Upon starting the software program, a graphical user interface for the application can be displayed on the touch screen for presentation to the user.

In some embodiments, one, some or all of relay-server identifiers 205 and/or communication protocols 210 are received from a receiver/transmitter 220. Receiver/transmitter 220 can include a signal receiver, a signal transmitter, or a combination (e.g., a transceiver). Signals can be received, e.g., from one or more relay servers 120 or other devices. Thus, for example, a relay server 120 can transmit an initial signal, which is received by receiver/transmitter 220 of first device 110. The initial signal can request that first device 110 send one or more signals to relay server 120, and can include a relay-server identifier 205 and a communication protocol 210. Thus, in various embodiments, a communication can be initialized between first device 110 and relay server 120 either at first device 110 (e.g., via input module 215) or at relay server 120 (e.g., via receiver/transmitter).

Receiver/transmitter 220 can receive and/or transmit signals of one or more types. In some instances, receiver/transmitter 220 includes a set of receivers and/or transmitters, each receiver and/or transmitter being configured to receive and/or transmit signals of different types with respect to other receivers and/or transmitters. For example, a first transceiver can be tuned to receive and transmit signals within first frequency bands and a second transceiver can be tuned to receive signals within second frequency bands. Examples of types of signals that can be received or transmitted include: wireless signals (e.g., RF signals), optical signals, or electrical signals. One or more receivers or transmitters can be tuned to receive or transmit signals at particular frequency bands.

Receiver/transmitter 220 can include suitable hardware for performing device discovery, connection establishment, and communication. Receiver/transmitter 220 can include hardware for performing wireless communications with wireless voice and/or data networks and can, e.g., include an RF transceiver (e.g., using mobile telephone technology such as GSM or CDMA, advanced data network technology such as 3G or EDGE) that enables a user of first device 110 to place telephone calls over a wireless voice network. Receiver/transmitter 220 can include any suitable combinations of hardware for performing WiFi (e.g., IEEE 802.11 family standards) based communications with other WiFi enabled devices. Receiver/transmitter 220 can be configured to operated based, e.g., on Bluetooth LE and/or Bluetooth BR/EDR.

First device 110 can include a first-device location estimator 225 that estimates a past, current or future location of first device 110. The estimated location can be based on an analysis of one or more signals. Analysis of the signals can allow for an estimation as to which of external devices are relatively near first device 110, which can allow for an estimation of a location of first device 110. For example, the analysis can identify one or more (e.g., two, three, four or more) of GPS satellites, cell towers, WiFi access points or wireless servers (e.g., edge servers). Each external device can be associated with a known location, such that a location of first device 110 can be estimated, e.g., via a triangulation technique.

In some instances, signals analyzed by first-device location estimator 225 are received by receiver/transmitter 220. In some instances, signals analyzed by first-device location estimator 225 are received by one or more other components. For example, first-device location estimator can include or be coupled to a GPS receiver 230 that receives GPS signals identifying GPS satellites, a cell-tower detector 235 that detects which cell tower or cell towers are carrying cellular communications associated with first device 110, a WiFi detector 240 that detects nearby WiFi access points, and/or an IP detector 245 that identifies an IP address assigned to a device (e.g., first device 110). In some instances, receiver/transmitter 220 includes one or more of GPS receiver 230, cell-tower detector 235, WiFi detector 240 and IP detector 245.

First-device location estimator 225 can estimate a location of first device 110, e.g., using a triangulation technique. Locations of GPS satellites, cell towers, WiFi access points, or servers can be determined, e.g., based on analyzing the signal (e.g., when the signal identifies a location), by consulting landmark-location storage data, or by receiving (e.g., via receiver/transmitter 220) the locations. In some instances, a location of first device 110 is determined by analyzing multiple signals received from a same type of external device (e.g., GPS satellites), and in some instances, a location of first device 110 is determined by analyzing multiple signals received from different types of external devices.

In some instances, the location is estimated at least in part based on an analysis of user habits or default conditions. For example, for various time periods, first-device location estimator 225 can estimate a default location where the person is most likely to be at that time. As another example, a single default location (e.g., "home") can be determined by a user setting or analysis of a distribution of locations at which the user is estimated to be.

Detection of multiple types of signals can improve a speed at which a location can be estimated. For example, a cell-tower detection can allow for an estimate of a first location including a geographical cell area associated with a cell tower, and GPS receiver 230 can then selectively scan for signals from a subset of GPS satellites. Detection of multiple types of signals can also improve a reliability of a location estimation. For example, multiple location estimations can be performed based on different signal types, and the estimations can then be compared.

A location estimated by first-device location estimator 225 can include an absolute location, a relative location, a quantitative location (e.g., geographical coordinates) and/or a quantitative location. The location can include a distance (e.g., from an external device or from a base point). The location can include a region or zone. For example, the location can include a geographical area associated with a cell associated with a cell tower. The location can include multiple levels of granularity (e.g., a city, a zip code, a street, or geographic coordinates). The location can include a confidence interval or reliability metric.

First device 110 can include an activity detector 250 that is coupled to input module 215 and detects user input received (e.g., via input module 215) by first device 110. Activity detector 250 can determine a general activity state or particular types of activity. For example, activity detector 250 can determine that no user input has been received via input module 215 for a period of time, and thus that the activity state is "inactive". Activity detector 250 can further detect particular activities, such as changes to power states, logging in or logging out of the device, initiating a program or application, initiating a particular program or application, closing a program or application, closing a particular program or application, closing all programs or applications, or changing a user status.

First device 110 can include a clock 255. Clock 255 can identify an absolute time, relative time or time stamp. The time can be associated with, e.g., an activity detected by activity detector 250, a time at which a signal is to be or is generated, or a time at which a signal is received or transmitted.

First device 110 can include a signal generator 260. Signal generator 260 can generate a signal including data identifying one or more locations estimated by first-device location estimator 225, activity or activity states detected by activity detector 250, and/or one or more times determined by clock 255. In some instances, the generated signal includes data identifying information about a received signal (e.g., a time stamp or content of a GPS signal). The generated signal can further include information related to first device 110, such as identifying information or communication capabilities. Signal generator 260 can generate the signal, e.g., in accordance with one or more communication protocols 210.

The signal generated by signal generator 260 can be transmitted by receiver/transmitter 220. The generated signal can be transmitted, e.g., to a relay server 120 identified by a relay-server identifier 205. The generated signal can be transmitted in accordance with one or more communication protocols 210. Thus, in some instances, a signal is not generated and/or a signal is not transmitted until a particular condition has been met, a particular time period has passed since a previous transmission or it is a particular time. The generated signal can be transmitted wirelessly.

A particular first device 110 can include one, some or all of the features shown in FIG. 2 and/or can include additional features not shown in FIG. 2. For example, in some instances, first device 110 include an identifier of an event location (e.g., by identifying the location from an event input by a user), display module, power supply, motion detector, or speaker. In some instances, server 110c associated with a calendar service does not include a first-device location estimator 225. Badge reader 110f also might not include a location estimator, e.g., if the reader is installed at a fixed location. In another example, in some instances, a vehicle accessory 110a does not include an activity detector 250.

One or more components of first device 110 (e.g., first-device location estimator 225, activity detector 250, signal generator 260, or receiver/transmitter 220) can be implemented by one or more processors or one or more integrated circuits. One or more components of first device 110 (e.g., first-device location estimator 225, activity detector 250, signal generator 260, or receiver/transmitter 220) can correspond to implementation of one or more software programs.

Software programs can be installed on first device 110 by its manufacturer and/or installed by a user. Examples of software programs can include operating systems, applications for locating devices (e.g., computers, vehicles, phones), productivity applications, video game applications, personal information management applications, applications for playing media assets and/or navigating a media asset database, applications for controlling a telephone interface to place and/or receive calls, and so on.

A storage module (e.g., including relay-server identifiers 205 and/or communication protocols) can be implemented, e.g., using disk, flash memory, random access memory (RAM), hybrid types of memory, optical disc drives or any other storage medium that can store program code and/or data. The storage module can further store software programs that define operations, e.g., of first-device location estimator 225, activity detector 250, or signal generator 260.

Figure 3:
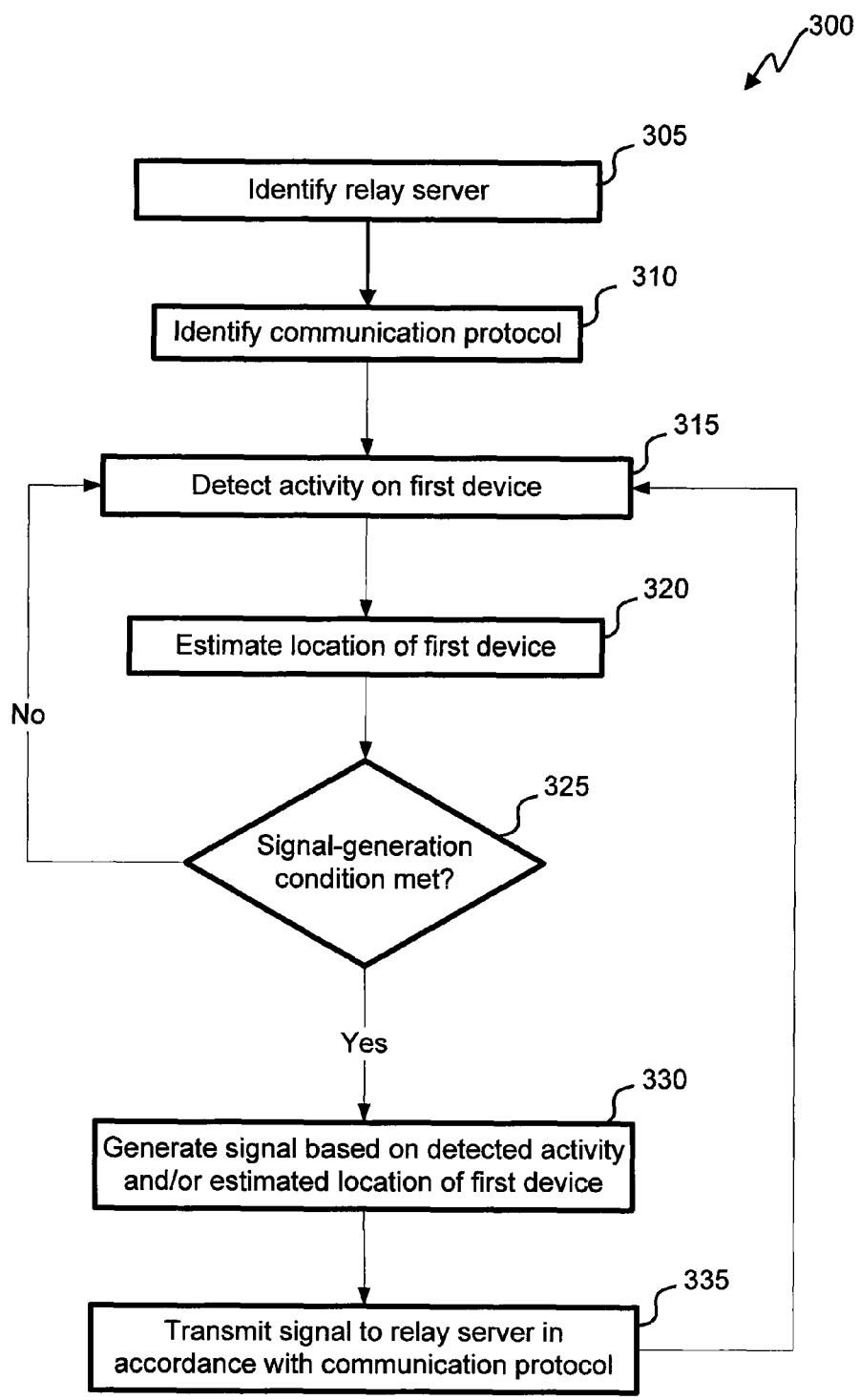
FIG. 3 is a flow diagram of a process for communicating first data from a first device to a relay server according to an embodiment of the present invention.

FIG. 3 is a flow diagram of a process 300 for communicating first data from a first device to a relay server. Process 300 can be performed by e.g., a first device 110. Process 300 can be used, in certain embodiments, by first device 110 to communicate with a relay server 120.

At block 305, a relay server can be identified, and at block 310, a communication protocol can be identified. For example, a relay server and/or communication protocol can be identified based on one or more user inputs received, e.g., via input module 215. As another example, a relay server and/or communication protocol can be identified based on one or more signals received by receiver/transmitter 220 from another device (e.g., relay server 120). As another example, a relay server can be identified by accessing a stored relay-server identifier 205, and/or a communication protocol can be identified by accessing a stored communication protocol 210. Relay-server identifier 205 and/or communication protocol 210 may have been stored, e.g., subsequent to receiving user input identifying the relay server or protocol or subsequent to receiving a signal from another device identifying the relay server or protocol.

An identification of a relay server can include, e.g., identifying a path, an IP address, an account address, or a server name of the relay server. A communication protocol can include, e.g., content to be included in a communication signal, format of the communication signal, a frequency-of-transmission of communication signals (e.g., a general frequency, a maximum frequency or a minimum frequency), a condition of transmission (e.g., detection of a new activity, or estimation of a new location), or passage of a particular time period since a last transmission).

At block 315, activity can be detected on first device 110. For example, activity detector 250 can detect user-input activity received via input module 215. In some instances, the activity relates to any user input. The activity can therefore, e.g., be identified as "activity: present" if any user input has been received or "activity: absent" if no user input has been received. In some instances, the activity relates to specific types of user input or threshold amounts of user inputs. The activity can, e.g., identify whether a user has logged out of an account, sent an email, or requested directions to a destination.

At block 320, a location of first device 110 can be estimated. The location can be estimated, e.g., by first-device location estimator 225, which can estimate the location based on an analysis of received signals, such as signals received from one or more of: receiver/transmitter 220, GPS receiver 230, cell-tower detector 235, WiFi detector 240, and IP detector 245.

At block 325, it can be determined whether a signal-generation condition has been met. The signal-generation condition can include a condition from the communication protocol identified at block 310. It can relate to a characteristic of the activity detected at block 31 and/or location estimated at block 320. For example, it can relate to whether any change in the activity or estimated location has occurred since a previous transmission or whether a particular type of change has occurred (e.g., a "log off" activity or movement exceeding a mile). In some instances, the signal-generation condition includes a time-related condition, such as whether a particular time period has elapsed since a most recent signal generation or transmission or whether a particular absolute time has been reached.

At block 330, a signal can be generated based on the location estimated at block 320 and/or the activity detected at block 315. The signal can include data identifying the estimated location and/or detected activity. The signal can be generated, e.g., by signal generator 260. In some instances, the generation of the signal is conditioned upon passage of a particular time period (e.g., since a previous signal generation), an absolute time being reached, or a change (generally or meeting a criterion such as exceeding a threshold) in an estimated location and/or activity detection. The signal can include an identifier of first device 110 that is generating the signal.

At block 335, the generated signal can be transmitted. The generated signal can be transmitted to the relay server (e.g., relay server 120) identified at block 305 and/or in accordance with a communication protocol identified at block 310. The generated signal can be transmitted by receiver/transmitter 220 and can be transmitted as an RF signal.

One or more blocks of process 300 can be repeated. FIG. 3 depicts an instance in which blocks 315-330 are repeated. Other repetitions can also or alternatively occur. For example, blocks 310-330 can be repeated, e.g., in circumstances in which multiple communication protocols exist, and different types of signals are to be generated in accordance with each protocol.

In some instances, process 300 can include one or more additional actions, such as receiving and/or storing a relay-server identifier and/or communication protocol, storing a transmitted signal, or analyzing changes in estimated locations or detected activity. In some instances, a location of a person is estimated in addition to or instead of estimating a location of first device 110. For example, the location of the person can be estimated based on a time and location of an event (in the person's calendar or that he was invited to), a physical location associated with an access to an account, or the estimated location of first device 100.

In some instances, process 300 does not include one or more of the depicted blocks. For example, block 315 can be omitted and the signal can be generated at block 330 based on the estimated location and not the detected activity, or block 320 can be omitted and the signal can be generated at block 330 based on the detected activity and not the estimated location. As another example, both blocks 315 and 320 can be omitted, and the signal can be generated based on other data (e.g., based on upcoming calendar events).

Figure 4:
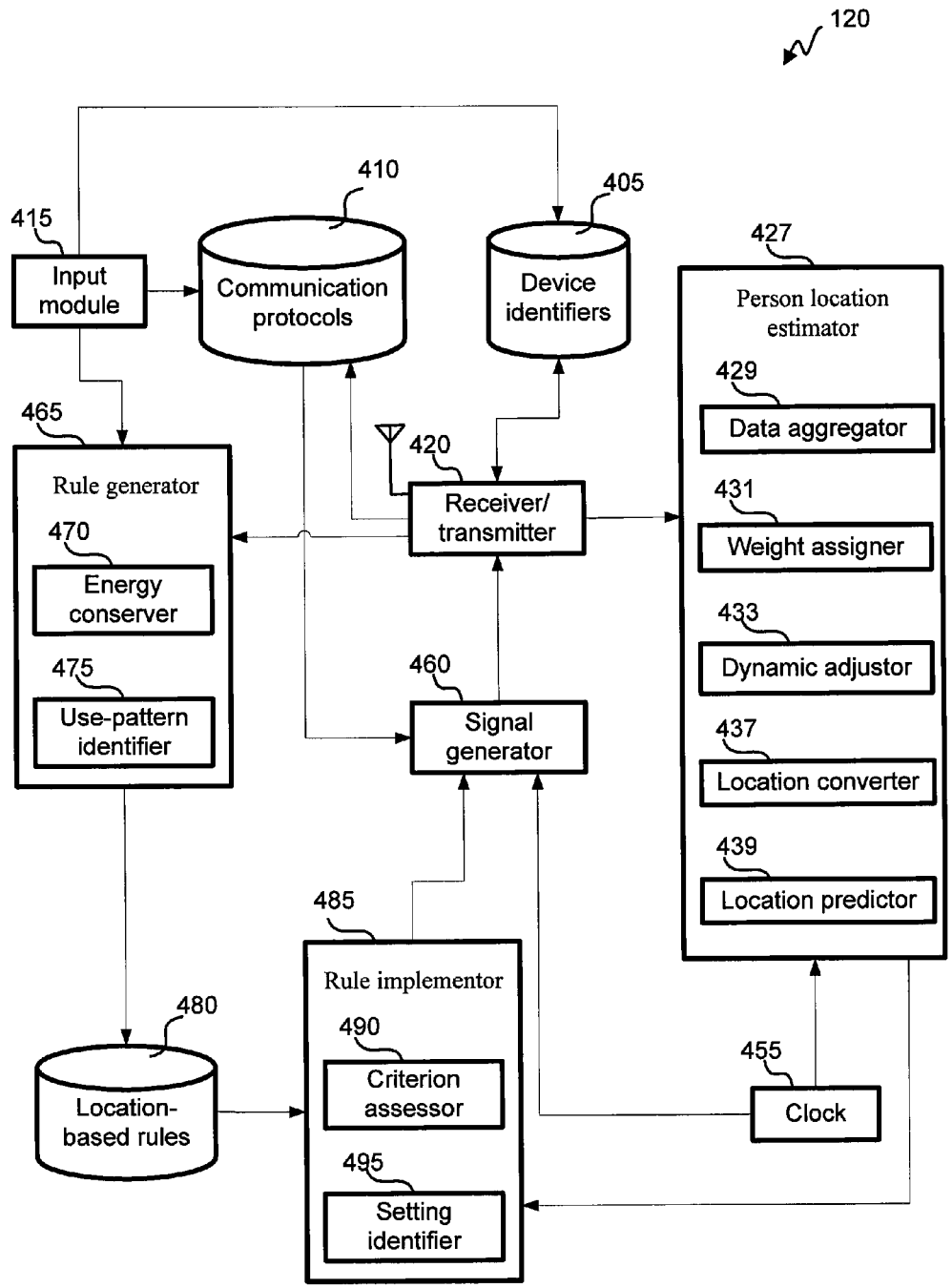
FIG. 4 illustrates a block diagram showing an exemplary relay server according to an embodiment of the present invention.

FIG. 4 is a block diagram showing an exemplary relay server 120. Relay server 120 can include a storage module, which can include one or more databases and stored data. For example, one or more device identifiers 405 can be stored. Device identifiers 405 can identify properties pertaining to one or more devices (e.g., first devices 110) that previously have sent, can send or are likely to send communications to relay server 120. Device identifiers 405 can identify properties pertaining to one or more devices (e.g., second devices 130) that relay server 120 has sent, can send or is likely to send communications to. Device identifiers 405 can include, e.g., an IP address, a server name, an account name or address, a physical path, or a network path.

One or more communication protocols 410 can also be stored. Communication protocols 410 can indicate communication characteristics regarding received communications, communications that can be or are likely to be received in the future, communications that have been transmitted, or communications that can be or are likely to be transmitted in the future. For example, communication protocols 410 can indicate characteristics of communications received at relay server 120 from first device(s) 110 and/or characteristics of communications transmitted from relay server 120 to second device(s) 130. Communication protocols can indicate a type of signal, a communication schedule, a communication condition, or requested communication content. For example, a communication protocol 410 can indicate that first device 110 transmits a communication to relay server 120 to identify when first device 110 has detected user activity on the device, and that the communications are only sent upon detecting a new type of activity. As another example, a communication protocol 410 can indicate that relay server 120 is to transmit a communication to one, more or all second devices 130 when a person is estimated to be within a particular location (e.g., 1 mile from home, on a home block or at a regular workplace).

In some embodiments, one, some or all of device identifiers 405 and/or communication protocols 410 are received from a user via an input module 415. Input module 415 can have one or more characteristics disclosed with respect to input module 215. For example, input module 415 can include a keyboard and computer mouse and can be coupled to a display module (not shown) of relay server 120.

In some embodiments, one, some or all of device identifiers 405 and/or communication protocols 410 are received from a receiver/transmitter 420. Receiver/transmitter 220 can include a signal receiver, a signal transmitter, or a combination (e.g., a transceiver). Signals can be received from and/or transmitted to first device 110, second device 130, or another device. Thus, for example, receiver/transmitter 420 can transmit a communication to first device 110 requesting information (e.g., to be sent immediately or at one or more future times, such as times at which a condition is satisfied), receive a communication from first device 110 that includes the information, receive a request from second device 130 for the information or a processed version of the information (e.g., immediately or at one or more future times), and/or transmit a communication to second device 130 with the information or a processed version of the information. A request sent to first device 110 can include an identifier of relay server 120 and/or a communication protocol. A request received from second device 130 can include an identifier 405 of second device 130 and/or a communication protocol 410. A request transmitted from relay server 120 can include an identifier of relay server 120 and/or a communication protocol 410.

Thus, in various embodiments, a communication can be initialized between relay server 120 and first device 110 either at relay server 120 (e.g., via input module 415) or at first device 110 (e.g., via receiver/transmitter 420). Similarly, in various embodiments, a communication can be initialized between relay server 120 and a second device 130 either at relay server 120 (e.g., via input module 415) or at second device 130 (e.g., via receiver/transmitter 420).

Receiver/transmitter 420 can include one or more characteristics as disclosed with respect to receiver/transmitter 220. For example, receiver/transmitter 420 can include multiple receivers and/or transmitters; can be configured to receive and/or transmit RF signals; and/or can include hardware for performing device discovery, connection establishment, and performing wireless communications with wireless networks.

Relay server 120 can include a person location estimator 427 that estimates a past, current or future location of a person. The estimated location of the person can depend on data in one or more signals received from one or more devices associated with the person, activity of the devices, and/or locations of the devices. For example, it can be assumed that the person generally is always near a mobile first device (e.g., mobile phone 110d). Thus, a location of the mobile first device can be informative and/or indicative of the person's location. As another example, it can be assumed that any activity on a particular fixed-location first device (a desktop computer 110e at the person's workplace) is attributable to actions of the person. Thus, detection of any activity on the fixed-location first device can be informative and/or indicative of the person's location. As yet another example, a fixed-location first device can be able to recognize a person (e.g., based on an input received by the person such as a numeric code or badge scan, facial recognition performed based on camera-sensor data, and/or voice recognition performed based on microphone-sensor data). Thus, detection of the activity associated with the recognition can be informative and/or indicative of the person's location.

In some instances, relay server 120 receives signals from a set of first devices 110. Person location estimator 427 can include a data aggregator 429 that aggregates the data within all of the received signals. Data aggregation can include a dimensionality reduction. In some instances, one or more vectors or matrices are generated or updated. For example, a matrix can identify a location of each first device and an activity of each first device. Some or all of the information can be determined based on the signals, and some can be based on properties of the first devices generally. For example, a location of an immobile first device can be generally established (e.g., based on user input or an initial communication) and not included in subsequent communications from the immobile first device. The aggregated data can have missing elements (e.g., when a first device 110 has not transmitted a signal within a period of time) or an element not applicable to or irrelevant for a particular device (e.g., an activity level of mobile phone 110d can be irrelevant if it is assumed that the person is always near the mobile phone 110d). In some instances, the aggregated data also includes a motion of one or more first devices 110. Data aggregator 429 can further convert received data prior to or subsequent to the aggregation, such that the aggregated data includes similar or same units.

Person location estimator 427 can include a weight assigner 431 that assigns one or more weights to data in signals from first devices 110. In some instances, one or more weights are assigned to data associated with each first device. A weight can include a numeric value or a function. For example, a weight can indicate that the weight for a particular first device is equal to a factor multiplied by a detected activity level, or various numeric values associated with qualitative activity levels. Examples of weights assigned to various activity levels can include: powered off=0; powered on and no activity=0.1; logged in=0.2; logged in and minimal input=0.5; logged in and nearly constant input=1. Weights can be determined based on, e.g., user input (e.g., received via input module 415 or input module 215), a learning algorithm, or settings on relay server 120 or first device 110. Weights can depend, e.g., on how informative associated data empirically was with regard to a particular person's location, how informative a type of data empirically is with regard to a locations of people with a population (e.g., mobile phones can be strong predictors of people's locations), consistency of data with other data, frequency of data availability, or time stamps associated with the data (e.g., data collected more recently can be assigned a higher weight than data collected less recently).

Person-location estimator 427 can include a dynamic adjustor 429 that can adjust properties associated with the estimation of the person's location based on received data. For example, the dynamic adjustor can assess how informative particular data was as to a person's location. Dynamic adjustor 433 can estimate an "actual" location of the person, based on user inputs received at first device 110, relay server 120, and/or second device 130 (e.g., explicit inputs identifying a person's location); or based on consistency across time of location estimations (e.g., gradually varying location estimates can be estimated to be more accurate than rapidly varying estimates). Dynamic adjustor 433 can apply a learning algorithm, such as a neural network or Bayesian error-sensitive technique to determine whether other weight assignments would have empirically improved the person-location estimations and to identify the weights. In some instances, dynamic adjustor 427 can further adjust a manner in which data is aggregated by data aggregator 429. For example, data aggregator 429 can aggregate data such that each datum is associated with a degree of specificity (e.g., a location identifying particular coordinates, versus a nearest cross street, versus a zip code, or versus a cell-tower region). The degree of granularity can be adjusted to improve the estimations.

Person-location estimator 427 can include a location converter 437 that converts units of an estimated location. The conversion of the location can allow for an estimation of a location that is, e.g., relevant for operation of a particular second device 130. For example, while a first estimation of a person's location can include an estimation of the person's geographical coordinates, operations of a particular second device 130 can merely depend on whether the person is within a five-mile radius from the second device 130 (or relay server 120). In some instances, location converter 437 converts an estimated location of a person into multiple converted estimated locations. Different conversion can, e.g., correspond to different second devices 130. For example, a first conversion can indicate whether the person is "at work", a second can indicate whether the person is within a 5-minute radius of a first location (e.g., home), and a third a zip code.

Exemplary units of pre- or post-conversion locations include: geographical coordinates, streets, cross-streets, physical addresses, zip codes, cities, states, country, cell-tower regions, distances from a base point. In some instances, units can include qualitative geographical areas, such as, "work", "garage", "front porch", "grocery store". Absolute geographical areas associated with each of these qualitative regions can be user-defined (e.g., via an input module) or learned. For example, relay server 120 can estimate that a person is reliably within a first area from 9 am-5 pm on Mondays-Fridays and a second area at nights and can therefore estimate the first area to be "work" and the second to be "home". Each area can be associated with particular first or second devices, use patterns of second devices 130, frequent times of presence, and/or names. In some instances, each area is not named.

Person-location estimator 427 can include a location predictor 439 that predicts a future location of the person, an estimated time of arrival of the person at the future location, and/or a time period expected to pass before the person arrives at the future location. The predicted location can depend, e.g., on a current and/or past estimated location, empirical travel patterns (specific to the person or not), estimated destinations (e.g., based on inputs received by a mapping device or program, such as a GPS system, based on calendar events, or based on frequented locations during particular time periods), external sources (e.g., received traffic conditions), and/or a movement of one or more first devices (e.g., detected by a motion-detector in the first device or a time-elapsed analysis of the first device's location). For example, if it is estimated that a person is leaving work (e.g., because he powered off his work desktop and scanned his badge while leaving the building), location predictor 439 can estimate that he will arrive at home in 15 minutes based on an empirical assessment of his locations. As another example, if it is estimated that a person is in his car, GPS data (e.g., received from a GPS accessory 110a in the car) can be used by location predictor 439 to determine where he is going and how long it can be before he arrives.

Thus, person location estimator 427 can output one or more locations. In some instances, multiple outputs have different units. The one or more locations can include an estimate of a person's past location, a present location or a future location.

Relay server 120 can include a clock 455. Clock 455 can identify an absolute time, relative time or time stamp. The time can be associated with, e.g., a time at which a signal is received at receiver/transmitter 420, a time at which a signal is to be generated, or a time at which a person's location is estimated by person location estimator 427. In some instances, the time is used by location predictor 439 to predict a future location, or estimated time of arrival. In some instances, the time is used by data aggregator 429 to aggregate data in a time-sensitive manner (e.g., only aggregating data associated with recent time stamps). In some instances, the time is used by weight assigner 431 while assigning weights (e.g., to assign higher weights to data associated with recent time stamps).

Relay server 120 can include a signal generator 460. Signal generator 460 can generate a signal including data identifying one or more locations estimated person location estimator 427, one or more data features received via receiver/transmitter 420 from at least one first device, and/or one or more times determined by clock 455. In some instances, the generated signal includes data identifying information about a received signal (e.g., a time stamp or content of a signal received from a first device 110). The generated signal can further include information related to relay server 120, such as identifying information or communication capabilities. Signal generator 460 can generate the signal, e.g., in accordance with one or more communication protocols 410.

The signal generated by signal generator 460 can be transmitted by receiver/transmitter 420. The generated signal can be transmitted, e.g., to a device identified by a device identifier 405, such as a second device 130. The generated signal can be transmitted in accordance with one or more communication protocols 410. Thus, in some instances, a signal is not generated and/or a signal is not transmitted until a particular condition has been met, a particular time period has passed since a previous transmission or it is a particular time. The generated signal can be transmitted wirelessly.

Relay server 120 can include components related to identification and application of one or more location-based rules. Relay server 465 can include a rule generator 465 that generates a location-based rule 480. The generated rule can include one or more location conditions and/or one or more second-device settings. For example, the rule can indicate that if a person is estimated to be within a particular distance from a base point (e.g., relay server 120, home, or a second device 130), a second device is to "power on", adjust a setting (e.g., a heating setting), or deactivate (e.g., a security feature). A rule can apply to one or more second devices 130, and one or more rules can apply to a particular second device 130.

In some instances, rule generator 465 can use input received from a user, via input module 415, to generate the rule. The input can include, e.g., a computer-language code or interactions with a user interface (e.g., clicking buttons or selecting items on a list or menu). Rule generator 465 can alternatively or additionally use signals received via receiver/transmitter 420 (e.g., from first device 110 or second device 130) to generate the rules. For example, a user can interact with a mobile phone 110d to identify rule properties, or a user can interact with a security system 130g to identify rule properties.

A rule can be generated at least in part by local intelligent technology. For example, rule generator 465 can include an energy conserver 470 and/or a use-pattern identifier 475. Energy conserver 470 can include pre-programmed energy-conservation techniques or can be based on an analysis of correlations between uses of second devices 130 and estimated person locations identified by use-pattern identifier 475. For example, energy conserver 470 can determine that if the person is at least one mile away from a base point and is moving away from the base point, one or more second devices 130 at the base point are to adjust their settings to reduce energy usage (e.g., powering off or adjusting heating settings). As another example, use-pattern identifier 475 can determine when a person is likely to use and/or adjust settings on second device 130 and generate rules based on these patterns. If a person is likely to use an oven 130b approximately 25 minutes after arriving home from work, the oven 130b can be preheated approximately 20 minutes after the person arrives home from work, and energy conserver 470 can bias the oven 130b to be turned off prior to this time. If a person is likely to activate a security system every time he leaves the house, the security system 130g can be activated upon determination that the person has moved from inside the house to an adjacent area such as a front porch or a garage. Thus, location-based rules 480 generated based on performance by energy conserver 470 and/or use-pattern identifier 475 can allow second devices 130 to be conveniently ready for operation when a person likely desires them to be operable but reducing energy usage in other circumstances.

Location-based rules 480 can be stored, e.g., in a storage module (e.g., a same one or different that stores communication protocols 410 and/or device identifiers 405). Each location-based rule 480 can be associated with one or more second devices 130. Location-based rules 480 can be repeatedly updated by rule generator 465, e.g., based on new user inputs, received signals, or identified use patterns.

A rule implementor 485 can access and implement one or more location-based rules 480. Rule implementor 485 can include a criterion assessor 490 and/or a setting identifier 495. Criterion assessor 490 can identify a location-based criterion (e.g., a condition) from a location-based rule 480 and determine whether the criterion has been met. For example, criterion assessor 490 can determine whether an estimated location of a person estimated by person-location estimator 427 meets the criterion (e.g., whether the estimated location is within an absolute geographical region, whether the estimated location is within a qualitative region, whether the estimated location is closer than a distance threshold from a base point, or whether the estimated location is further than a distance threshold from a base point). In some instances, applying the criterion involves determining whether a predicted location (e.g., an estimated time before arrival to a destination) satisfies a condition (e.g., whether the person is expected to be home within the next ten minutes).

Rule implementor 485 can include a setting identifier 495 that identifies one or more settings for a second device 130 based on implementation of the location-based rules. For example, a determination by criterion assessor 490 that a criterion has been met can result in setting identifier 495 identifying a setting adjustment to be applied at a second device. Settings can include, e.g., a power state (or on-off operation setting), an activation setting, a heating/cooling setting, or generating and sending a transmission (e.g., a message being sent indicating that the person is on his way home).

A signal generated by signal generator 460 and/or transmitted by receiver/transmitter 420 can identify an applicable location-based rule, whether a location-based criterion has been met, and/or a setting to be applied by a second device 130. Thus, in various embodiments, an estimated location of a person can be transmitted to a second device 130 and/or a setting for the second device 130 can be transmitted, the setting being based on the estimated location.

A relay server 120 can include one, some or all of the features shown in FIG. 4 and/or can include additional features not shown in FIG. 4, such as a display module, power supply, motion detector, or speaker. For example, in some instances, relay server 120 includes data aggregator 429 but not weight assigner 431, dynamic adjustor 433, location converter 437 and/or location predictor 439. Thus, relay server can, e.g., send one or more signals including aggregated first data from first devices 110 to second devices 130, and second devices 130 can (in some instances) themselves estimate a location of a person. As another example, relay server 120 may not include rule generator 465, location-based rules 480 and/or rule implementor 485, which can in some instances instead be present at second devices 130. As yet another example, relay server 120 can include one or more first-device location estimator 225, such that it can estimate a location of a first-device based on raw or partly processed data received from or about first devices 110.

One or more components of relay server 120 (e.g., person location estimator 427, rule generator 465, rule implementor 485, signal generator 460, or receiver/transmitter 420) can be implemented by one or more processors or one or more integrated circuits. One or more components of relay server 120 (e.g., person location estimator 427, rule generator 465, rule implementor 485, signal generator 460, or receiver/transmitter 420) can correspond to implementation of one or more software programs, which can be, e.g., installed by a manufacturer of relay server 120 and/or installed by a user.

A storage module (e.g., including device identifiers 405, communication protocols 410 and/or location-based rules 480) can be implemented, e.g., using disk, flash memory, random access memory (RAM), hybrid types of memory, optical disc drives or any other storage medium that can store program code and/or data. The storage module can further store software programs that define operations, e.g., of person location estimator 427, rule generator 465, rule implementor 485, signal generator 460, receiver/transmitter 420.

Figure 5:
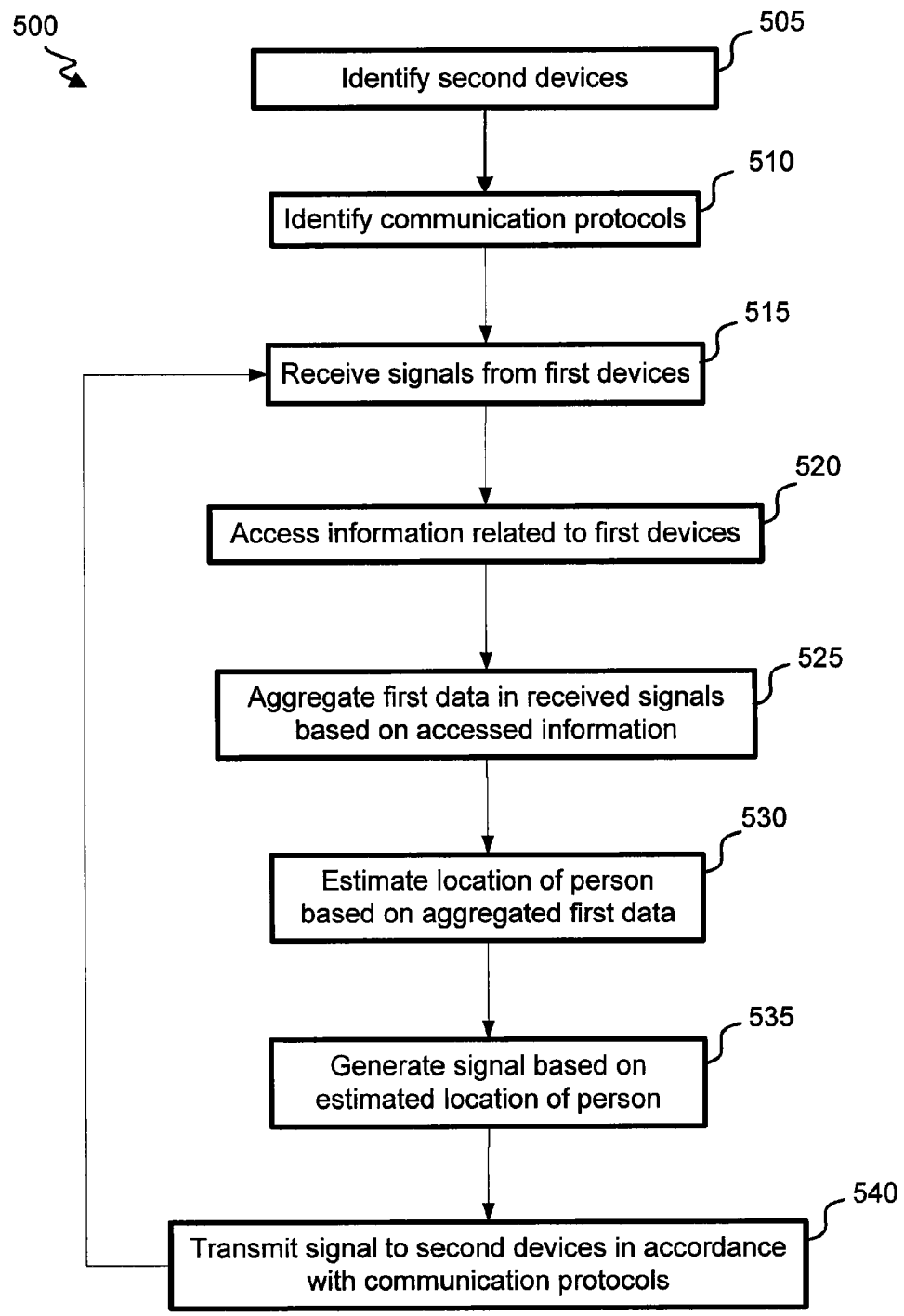
FIG. 5 is a flow diagram of a process for communicating second data from a relay server to a second device according to an embodiment of the present invention.

FIG. 5 is a flow diagram of a process 500 for communicating second data from a relay server to a second device 130. Process 500 can be performed by e.g., a relay server 120. Process 500 can be used, in certain embodiments, by relay server 120 to receive communications from one or more first devices 110 and to transmit communications to one or more second devices 130.

At block 505, one or more second devices can be identified, and at block 510, one or more communication protocols can be identified. For example, a second device and/or communication protocol can be identified based on one or more user inputs received, e.g., via input module 415. As another example, a second device and/or communication protocol can be identified based on one or more signals received by receiver/transmitter 420 from another device (e.g., a second device 130). As another example, a second device can be identified by accessing a stored device identifier 405, and/or a communication protocol can be identified by accessing a stored communication protocol 410. Device identifier 405 and/or communication protocol 410 may have been stored, e.g., in response to receiving user input identifying the device or protocol or in response to receiving a signal from another device identifying the device or protocol.

An identification of a second device can include, e.g., identifying a path, an IP address, an account address, or a server name of the second device. A communication protocol can include, e.g., content to be included in a communication signal to the second device, format of the communication signal, a frequency-of-transmission of communication signals (e.g., a general frequency, a maximum frequency or a minimum frequency), a condition of transmission (e.g., estimation of a new location, or satisfaction of a location-based criterion or identification of a new setting), or passage of a particular time period since a last transmission.

At block 515, one or more signals can be received from one or more first devices, e.g., via receiver/transmitter 420. The one or more signals can include first data that identify, e.g., a location, activity and/or movement of the source first device. In some instances, allocation, activity and/or movement of the source first device can be inferred based on receipt of the signal. For example, it can be known that each time a badge reader 110*f* transmits a signal to relay server 500, a badge a of a person has been scanned at a fixed location of the badge reader.

At block 520, information related to the first devices can be accessed. For example, a device identifier 405 can associate a particular first device 110 with a signal-identifying feature, such as an IP address, signal header content, or unique code. Thus, relay server 120 can be able to identify a source first device 110 by analyzing a received signal. A device identifier 405 can also or alternatively identify physical properties of a particular first device 110, such as whether it is mobile or in a fixed location, a position of any fixed location, historical first-data variation, or probability that the user is near the particular first device. A device identifier 405 can further indicate types of data that are likely to be transmitted in signals (e.g., that an estimated device location will be transmitted, but not an activity state).

At block 525, first data in the received signals can be aggregated, e.g., by data aggregator 429. The aggregation can depend on the accessed information. For example, 15 signals can be received. Based on an analysis of the accessed information, it can be determined that only 10 first devices transmitted the signals. Thus, the most recently received signal from each first device 110 can be aggregated. As another example, the information can indicate that particular variables (e.g., "activity") are irrelevant with regard to particular first devices 110 and/or not transmitted by particular first devices 110.

At block 530, a location of a person can be estimated based on the aggregated first data. For example, a person location estimator 427 can estimate the location of the person. The estimated location can depend, e.g. on one or more weights assigned to various datum or data (e.g., location estimations received from different first devices). The weights can be assigned by weight assigner 431, and the weights and/or an estimation technique can be dynamically adjusted based on empirical analyses by dynamic adjustor 433. In some instances, one or more estimated locations of the person include converted locations determined by location converter 437, such that it is in a unit relevant to a particular rule, a unit requested by a second device 430, or a standardized unit. In some instances, one or more estimated locations of the person include a predicted location, an estimated time of arrival or an estimated time until arrival determined by location predictor 439.

One or more preliminary or final estimated locations of the person can be associated with a confidence metric. The confidence metric can depend on a first device 110 contributing to location estimate. For example, if a mobile phone sends first data identifying its location, the person can be estimated to be with the phone with a high confidence (e.g., the confidence based on an empirical analysis of how predictive a phone's location is as to the person's location). Meanwhile, if no device is transmitting first data identifying its location and/or indicating that the person is nearby, the person can be estimated to be at a default location with a lower confidence (e.g., the confidence based on an empirical analysis of how predictive the default location is as to the phone's location).

At block 535, one or more signals can be generated (e.g., by signal generator 460) based on the estimated location of the person. The signal can include content identifying the estimated person location, one or more estimated device locations, aggregated data from received signals, and/or other information (e.g., a setting or an indication as to whether a location-based criterion has been satisfied). In some instances, the generation of the signal is conditioned upon passage of a particular time period (e.g., since a previous signal generation), an absolute time being reached, or a change in an estimated location (generally or meeting a criterion such as a change associated with a distance exceeding a threshold). In some instances, multiple signals are generated, and one, more or all signals can be associated with different second devices.

At block 540, the one or more generated signals can be transmitted to one or more second devices. The generated signal can be transmitted to one or more second devices identified at block 505 and/or in accordance with one or more communication protocols identified at block 510. In some instances, a single generated signal is transmitted (e.g., substantially simultaneously) to some or all second devices associated with relay server 120. In some instances, multiple generated signals are transmitted (e.g., substantially simultaneously), such that, e.g., one second device 130 receives one signal and another second device 130 receives another signal. The generated signal can be transmitted by receiver/transmitter 420 and can be transmitted as an RF signal.

One or more blocks of process 500 can be repeated. FIG. 5 depicts an instance in which blocks 515-540 are repeated. Other repetitions can also occur. For example, blocks 510-540 can be repeated, e.g., in circumstances in which multiple communication protocols exist, and different types of signals are to be generated in accordance with each protocol.

In some instances, process 500 can include one or more additional actions, such as receiving and/or storing the second-device identification and/or communication protocol, storing a received signal, associating a received signal with a first device, assigning a weight to a portion of data, predicting a time of arrival, or receiving a request from a second device for communications. In some instances, process 500 does not include one or more of the depicted blocks. For example, block 530 can be omitted, and the signal can be generated at block 535 based on the aggregated first data.

Figure 6:
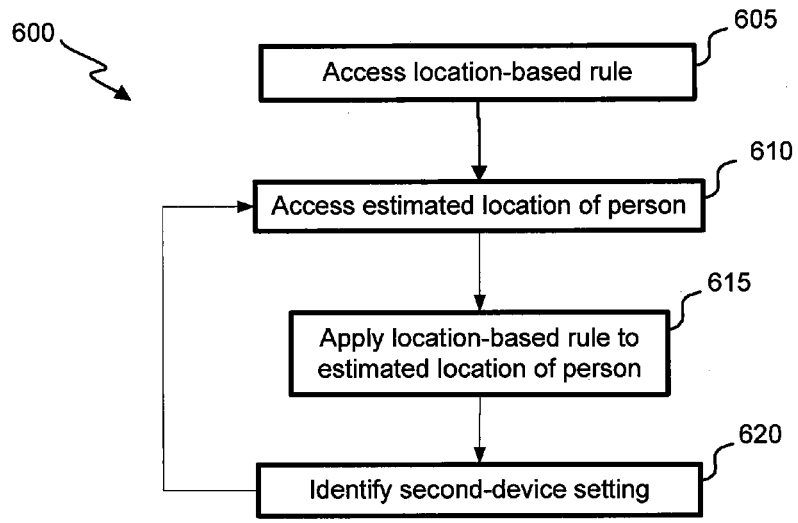
FIG. 6 is a flow diagram of a process for implementing a location-based rule according to an embodiment of the present invention.

FIG. 6 is a flow diagram of a process 600 for implementing a location-based rule, such as a location-based rule 480. Process 600 can be performed, e.g., by a relay server 120, a second device 130 or a first device 110. In some instances, relay server 120 implements the rule and adjusts its signal generation and/or transmission to one or more second devices based on a result of the implementation. In some embodiments, a rule is implemented by a device other than a relay server 120. For example, a second device 130 can implement a rule and can include a rule generator 465, a database of location-based rules, and/or a rule implementor 485.

At block 605, one or more location-based rules 480 can be accessed. For example, a location-based rule 480 can be generated by rule generator 465 based on user input, received signals or intelligent technology (e.g., energy conserver 470 and/or use-pattern identifier 475). In some instances, a location-based rule 480 is accessed by retrieving the location-based rule 480 from storage.

At block 610, an estimated location of a person can be accessed. For example, person location estimator 427 can estimate the location of the person based on first data (e.g., identifying locations and/or activity states of the source first devices) in one or more signals received from one or more first devices 110. In some instances, in estimated location of a person is determined based on data in a received signal, such as second data in a signal received at a second device 130 from a relay server 120. In some instances, a second device includes a person location estimator 427 and estimates the location of the person based on aggregated first data in one or more signals received from a relay server 120.

At block 615, one or more location-based rules can be applied to the estimated location of the person (e.g., by rule implementor 485). For example, criterion assessor 490 can determine whether a criterion in the location-based rule 480 is satisfied based on the estimated location of the person. Criterion assessor 490 can determine, e.g., whether the estimated location of the person is within a particular radius from a base point, whether the person is expected to arrive at a base point within a particular time period, whether the estimated location of the person is within a qualitative region (e.g., garage or front porch).

At block 620, one or more second-device settings can be identified (e.g., by setting identifier 495) based at least in part on the application of the location-based rule to the estimated location of the person. For example, a first setting can be associated with a satisfaction of a criterion and a second setting can be associated with a non-satisfaction of a criterion.

One or more blocks of process 600 can be repeated. FIG. 6 depicts an instance in which blocks 610-620 are repeated. Other repetitions can also occur. For example, blocks 605, 615 and 620 can be repeated, such that multiple location-based rules are applied to an estimated location of a person.

In some instances, process 600 can include one or more additional actions, such as generating a signal that includes data identifying the second-device setting and/or transmitting a signal (e.g., from relay server 120 to a second device 130) based on a time dependent on the application of the rule. As another example, process 600 can include configuring (e.g., at a second device 130) the second device 130 to implement the identified setting. In some instances, process 600 does not include one or more of the depicted blocks. For example, block 620 can be omitted (e.g., generally or if a criterion in the rule is not satisfied), and a signal including a result of the location-based rule application (e.g., a satisfaction status of a criterion) can be transmitted to a second device 130.

Figure 7:
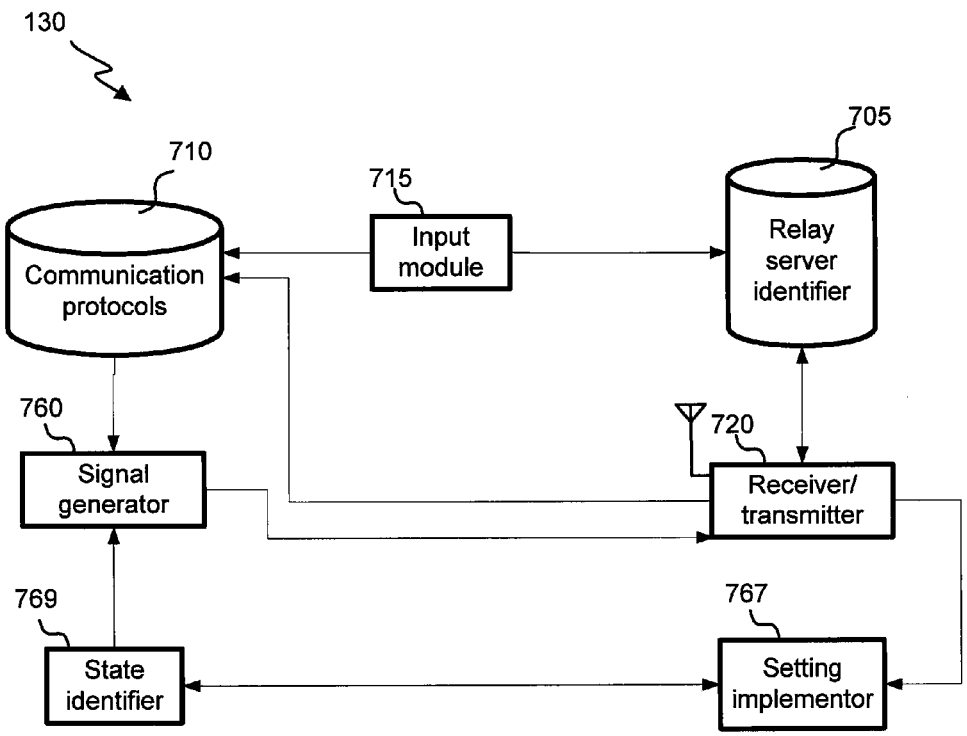
FIG. 7 illustrates a second device that can receive signals from a relay server according to an embodiment of the present invention.

FIG. 7 is a block diagram showing an exemplary second device 130. Second device 130 can include a storage module, which can include one or more databases and stored data. For example, one or more relay-server identifiers 705 can be stored. Relay-server identifier 705 can identify properties pertaining to, e.g., a relay server that can source communications received by second device 130 or receive communications transmitted by second device 130. Relay-server identifier 705 can include, e.g., an IP address, a server name, an account name or address, a physical path, or a network path.

One or more communication protocols 710 can also be stored. Communication protocols 710 can indicate a type of signal, a communication schedule, a communication condition, or expected communication content. For example, a communication protocol 710 is expected to receive a communication from relay server 120 when it is estimated that a person has moved or is moving to a substantially new location or when a new setting is to be implemented.

In some embodiments, one, some or all of relay-server identifier 705 and/or communication protocols 710 are received from a user via an input module 715. Input module 715 can have one or more characteristics such as those described with respect to input module 215.

In some embodiments, one, some or all of relay-server identifier 705 and/or communication protocols 710 are received from a receiver/transmitter 720. Receiver/transmitter 720 can include a signal receiver, a signal transmitter, or a combination (e.g., a transceiver). Signals can be received from and/or transmitted to, e.g., one or more relay servers 120 or other devices. For example, relay server 120 can transmit an initial signal to second device 130 identifying itself and/or identifying a communication protocol 710 used in a current and/or subsequent communications. As another example, second device 130 can transmit an initial signal to relay server 120, the initial signal requesting subsequent signals to be sent from relay server 120 to second device 130. The initial signal can include an identifier of second device 130 and/or a communication protocol 710. Thus, in various embodiments, a communication can be initialized between relay server 120 and second device 130 either by relay server 120 or by second device 130.

Receiver/transmitter 720 include one or more characteristics as disclosed with respect to receiver/transmitter 220. For example, receiver/transmitter 720 can include multiple receivers and/or transmitters; can be configured to receive and/or transmit RF signals; and/or can include hardware for performing device discovery, connection establishment, and performing wireless communications with wireless networks.

First device 130 can include a setting implementor 767 that implements one or more settings. For example, setting implementor 767 can control a power state, activation, volume, light level, temperature, recording state or automation state of second device 130 or a component of second device 130.

Setting implementor 767 can be coupled with a state identifier 769. State identifier 769 can identify a current state and/or setting of second device 130. Implementation of a setting by setting implementor 767 can depend on a current state. For example, if a television-recording device is to be adjusted to record a show on a particular channel at a given time (e.g., when it is estimated that a person is not home to view the show), it can be necessary to know a default recording setting (e.g., whether the device is programmed to record another show at that time, or is tuned to a different channel). Conversely, setting implementor 767 can affect a state of second device 130 and can transmit information about its setting implementation to state identifier 769 such that state identifier can update one or more states.

In some instances, second device 130 transmits one or more signals, e.g., to relay server 120. Second device 130 can include a signal generator 760 to generate the signal. The signal can include, e.g., a request for subsequent signals as described above and/or can include indications as to a current state identified by state identifier 760. The generated signal can be transmitted by receiver/transmitter 720.

A particular second device 130 can include one, some or all of the features shown in FIG. 7 and/or can include additional features not shown in FIG. 7, such as an activity detector, display module, power supply, one or more lights, recording capabilities, water lines, or heating elements. For example, second device 130 can include an activity detector that can be coupled to or include state identifier 769, and signal generator can generate signals to relay server 120 that identify detected activity. Thus, relay server 120 can adjust one or more location-based rules based on an empirical-based analysis of manual controls of second device 130. In some instances, second device 130 itself includes a rule generator 465 that generates and/or modifies location-based rules 480 and/or a rule implementor 485. In some instances, second device 130 includes a person location estimator 427.

One or more components of second device 130 (e.g., signal generator 760, setting implementor 767, or state identifier 769) can be implemented by one or more processors or one or more integrated circuits. One or more components of second device 130 (e.g., signal generator 760, setting implementor 767, or state identifier 769) can correspond to implementation of one or more software programs (e.g., installed by a manufacturer of second device 130 and/or by a user).

A storage module (e.g., including relay-server identifier 705 and/or communication protocols 710) can be implemented, e.g., using disk, flash memory, random access memory (RAM), hybrid types of memory, optical disc drives or any other storage medium that can store program code and/or data. The storage module can further store software programs that define operations, e.g., of signal generator 760, setting implementor 767, or state identifier 769).

Figure 8:
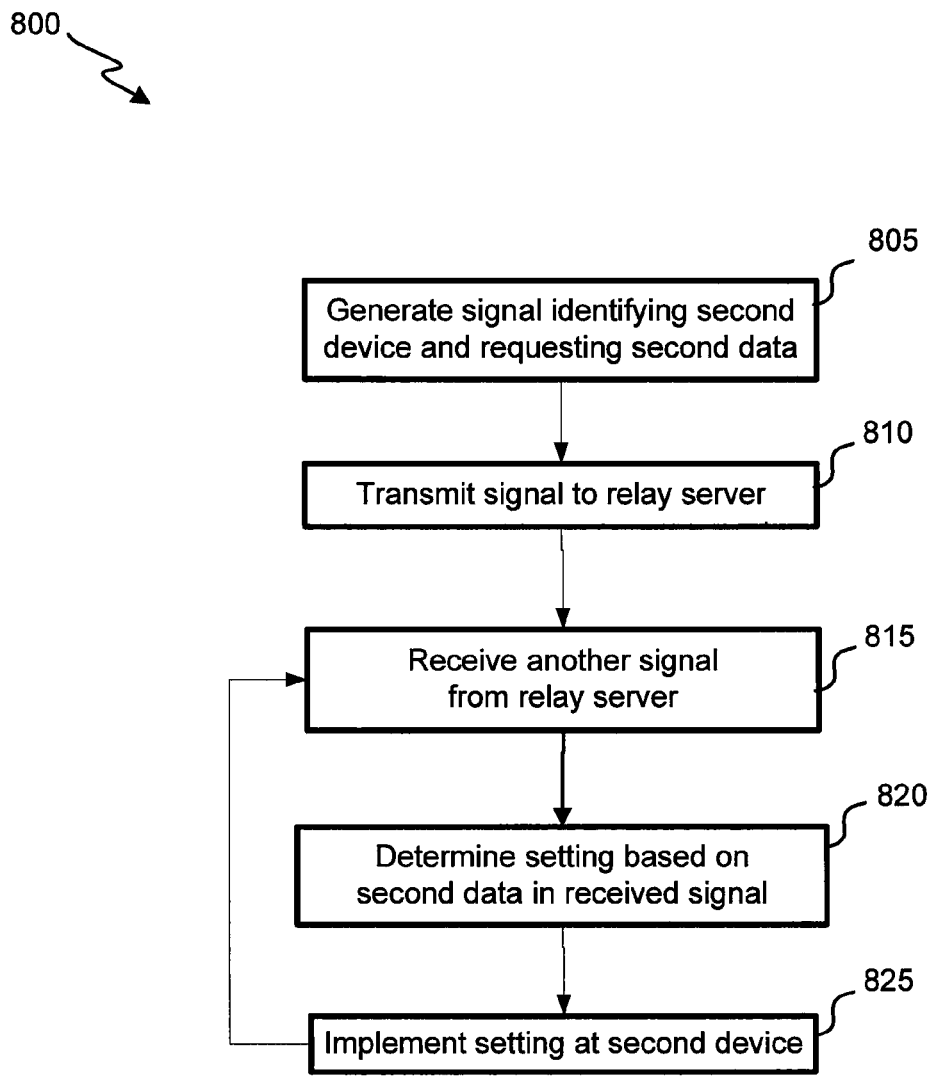
FIG. 8 is a flow diagram of a process for implementing a setting at a second device according to an embodiment of the present invention.

FIG. 8 is a flow diagram of a process 800 for implementing a setting at a second device 130. A setting can include, e.g., a "power off" setting sent to a lighting system, an "activate" setting sent to a security system, or a temperature-specific control setting sent to a heating/cooling system. Process 800 can be performed, e.g., by a second device 130.

At block 805, a signal can be generated (e.g., by signal generator 760) that identifies second device 130 and requests second data. For example, the signal can include an IP address, a server name, an account name or address, a physical path, or a network path associated with second device 130. The signal can include an RF signal or a signal of another type. The requested second data can include, e.g., an estimated location of a person, whether a location-based criterion has been satisfied, or a setting. In some instances, second device 130 does not request specific second data. For example, it can be determined that any second device 130 that requests data will receive particular content. The signal can also include one or more communication protocols which can indicate, e.g., conditions that are to be satisfied prior to transmission of a communication (e.g., that a new location, criterion-satisfaction status or setting has been identified).

At block 810, the generated signal can be transmitted (e.g., by receiver/transmitter 720) to relay server 120. For example, the signal can be wirelessly transmitted to relay server 120. The signal can be transmitted to a relay server identified by on a relay-server identifier 705.

At block 815, another signal can be received (e.g., by receiver/transmitter 720) from relay server 120, the another signal including the requested second data. In some instances, second data is determined at relay server 120 (e.g., sending the same or similar types of data and/or at the same or similar times) to all requesting second devices 130 or to all requesting second devices 130 having particular properties.

At block 820, a setting can be determined (e.g., by setting implementor 767) based on the second data in the received signal. The received signal can include the setting or information used to determine the setting locally at second device 130. For example, the received signal can include an estimated location of a person, and second device 130 can implement a location-based rule to identify a setting.

Thus, embodiments disclosed herein can allow settings of second devices 130 to be controlled based on estimated proximity of a person. A relay server 120 can determine an estimated location, and relay server 120 and/or second device 130 can determine an appropriate second-device setting to be effected based on the estimated location. For example, relay server 120 can alert a home power-control system when the user is within 5 miles from home and headed toward home. In some instances, a second device 130 determines whether a setting should be effected and/or a value of a setting to be effected based on received data. For example, a home-control heating system could determine that since the user is within 5 miles, it will set a new set point temperature at 75 degrees. In some instances, information from relay server 120 explicitly or implicitly indicates that a setting should be effected and/or a value of the setting. For example, a signal to an oven could include an oven preheating temperature indicating that the oven should preheat to that temperature, or the mere receipt of a signal from relay system 120 to a security system could indicate that it should de-activate.

At block 825, a setting can be implemented (e.g., by setting implementor 767) at second device 130. One or more blocks can be repeated. FIG. 8 depicts an instance in which blocks 815-825 are repeated. Other repetitions can also occur. For example, blocks 820-825 can be repeated, such that multiple settings are determined and implemented based on a received signal.

In some instances, process 800 can include one or more additional actions, such as estimating a location of a person based on the second data, determining whether a location-based criterion is met based on the second data, generating a location-based rule, or implementing a location-based rule based on the second data. In some instances, process 800 does not include one or more of the depicted blocks. For example, blocks 805-810 can be omitted, and second device 130 can be identified to a relay server via other techniques (e.g., user input at relay server 120).

FIG. 9 is a simplified block diagram of a computer system 900 that can be used in embodiments of the present invention. For example, first device 110, relay server 120 or second device 130 can incorporate part or all of computer system 900. As another example, all or part of process 300, 500, 600 and/or 800 can be performed by part or all of computer system 900. FIG. 9 is merely illustrative of an embodiment incorporating the present invention and does not limit the scope of the invention as recited in the claims. One of ordinary skill in the art would recognize other variations, modifications, and alternatives.

In one embodiment, computer system 900 includes processor(s) 910, random access memory (RAM) 920, disk drive 930, communications interface(s) 960, and a system bus 980 interconnecting the above components. Other components can also be present.

RAM 920 and disk drive 930 are examples of tangible media configured to store data such as audio, image, and movie files, operating system code, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

Embodiments of communications interface 960 can include computer interfaces, such as include an Ethernet card, wireless interface (e.g., Bluetooth or WiFi), a modem (telephone, satellite, cable, ISDN), (asynchronous) digital subscriber line (DSL) unit, FireWire interface, USB interface, and the like. For example, communications interface 960 can include interfaces to connect to a wireless network 990, and for transmitting and receiving data based over the network.

In various embodiments, computer system 900 can also include software that enables communications over a network such as the HTTP, TCP/IP, RTP/RTSP protocols, and the like. In alternative embodiments of the present invention, other communications software and transfer protocols can also be used, for example IPX, UDP or the like.

In various embodiments, computer system 900 can also include an operating system, such as OS X®, Microsoft Windows®, Linux®, real-time operating systems (RTOSs), embedded operating systems, open source operating systems, and proprietary operating systems, and the like. System 900 can also have other components e.g., user interface with keyboard, buttons, monitors, indicators, and the like.

The system and method described herein can be used to allow a user to control devices in an automated and flexible manner based on the user's location. For example, a user can establish an account with a service that provides relay server(s) 120. The user can register one or more of his electronic devices with relay server(s) 120 as a first (source device, a second (recipient) device or both. The user can register at a first device any device that is capable of providing information about the user's current and/or future location. For example, the user's phone, laptop computer, desktop computer, car, etc. can all be registered as first devices. The user can register as a second device any device that is capable of acting on information about the user's current and/or future location. For example, the user's home appliances (e.g., dishwasher or oven), security system, thermostat, lighting system, media system, car, etc. can all be registered as second devices.

In some embodiments, the user can interact with the relay server to direct the second device(s) to take action based on location information satisfying some criterion (e.g., turn up heat when user gets within 2 miles from home). In other embodiments, the user can instruct the relay server to notify the second device(s) when a location criterion is satisfied and the second device(s) can determine the action to be taken. Different criteria and/or actions can be assigned to different second devices.

In operation, the registered first devices can send location information to the relay server in an event-driven manner, with a particular device sending information only when an event indicative of location change occurs. Thus, it is not necessary for the relay server to poll any of the first devices; this can reduce power consumption by the first devices.

The relay server can use the information from the first devices to estimate the user's current and/or future location, e.g., as described above. Based on the estimation, the relay server can determine whether to send information to any of the user's registered second devices, e.g., depending on whether any of the location criteria specified by the user are satisfied. In some embodiments, the relay server can send just the location information to any second device for which a location criterion was satisfied; in some embodiments, the relay server can also send an instruction to take an action specified, e.g., by the user or device manufacture. For example, a car can be instructed to turn on upon detecting that a user is leaving his house.

In embodiments described herein, the relay server pushes notifications to the second devices. Consequently, it is not necessary for the second devices to poll the server. This can reduce power consumption by the second devices.

It will be appreciated that though a singular first device 110, relay server 120, or second device 130 can be referred to herein, in some embodiments, a set of first devices 110, relay servers 120, or second devices 130 can be used instead. Further, it will be understood in some embodiments of the invention, estimation of a location can include estimations of multiple locations—such as estimations of locations of multiple first devices 110, or estimations of locations of multiple people. For example, relay server 120 can estimate a location for each of a set of people (e.g., who live in a household or who are adults or young adults living in a household). Location-based rules can depend on a location of one, more or all of the set of people (e.g., such that all people are out of a house).

Circuits, logic modules, processors, and/or other components can be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention can be encoded on various computer readable storage media; suitable media include magnetic disk or tape, optical storage media such as compact disk (CD) or DVD (digital versatile disk), flash memory, and the like. Computer readable storage media encoded with the program code can be packaged with a compatible device or provided separately from other devices. In addition program code can be encoded and transmitted via wired optical, and/or wireless networks conforming to a variety of protocols, including the Internet, thereby allowing distribution, e.g., via Internet download.

Embodiments described herein provide an integrative approach for receiving signals from one or more first devices estimating a location of one or more people and intelligently controlling second devices (e.g., centralized devices) based on the location. By integrating data from a set of first devices, the person's location can be estimated in a variety of context (e.g., social settings, in a car, or at work). Communications with first devices can be performed in a manner to conserve power usage by the first devices. Further, the intelligent control of the second devices can provide additional power conservation. Meanwhile, analysis of use patterns or generating rules based on user inputs can allow second devices to be in desired operation states when a user wishes to use them.

Although the invention has been described with respect to specific embodiments, it will be appreciated that the invention is intended to cover all modifications and equivalents within the scope of the following claims.

What is claimed is:

1. A device for relaying location information, the device comprising:
    a receiver to receive first signals from a plurality of first devices associated with a person, each of the first signals comprising first data, the first data being indicative of an estimated location of the person, wherein, for at least one of the first devices, the first data is indicative of a real-time user-input activity;
    a location estimator to estimate a location of the person associated with the plurality of first devices, the location estimator comprising:
    a data aggregator to aggregate at least some of the first data in the first signals; and
    a weight assigner to assign one or more weights to the first data in the first signals, wherein the estimated location of the person is based at least in part on the assigned weights;
    a signal generator to generate one or more second signals based on the estimated location of the person, each of the one or more second signals comprising second data; and
    a transmitter that transmit the one or more second signals to a plurality of second devices.

2. The device of claim 1 wherein at least two of the plurality of second devices receive a same second signal from the signal generator.

3. The device of claim 1 wherein the second data in at least one of the second signals includes the estimated location of the person.

4. The device of claim 1 wherein the one or more transmitters transmit the one or more second signals to the plurality second devices wirelessly.

5. The device of claim 1 wherein the first data of at least one of the first signals includes an activity state, and wherein the one or more assigned weights are based at least in part on the activity state.

6. The device of claim 1 further comprising a rule implementor to apply a location-based rule, the rule implementor comprising:
    a criterion assessor to determine whether a criterion in the location-based rule is satisfied, the determination being based at least in part on the estimated location of the person,
    wherein the generation of the one or more second signals or the transmission of the one or more second signals is based at least in part on the determination of whether the criterion in the location-based rule is satisfied.

7. The device of claim 6 wherein the rule implementor further includes a setting identifier to identify a setting for at least one of the plurality of second devices, the setting being based at least in part on whether the criterion in the location-based rule is satisfied, wherein the second data in at least one of the second signals includes the setting.

8. The device of claim 6 further comprising a rule generator that generates or updates the location-based rule based at least in part on use patterns of at least one of the second devices.

9. A method for relaying location information, the method comprising:
 receiving, at a server, first data collected by a plurality of first devices, the first data from each device being indicative of a location of a person associated with the plurality of first devices, wherein, for at least one of the first devices, the first data is indicative of a real-time user-input activity;
 aggregating, by the server, the received first data across the first devices,
 estimating, by the server, a location of the person based at least in part on the aggregated data;
 generating, by the server, one or more signals, the one or more signals including second data based at least in part on the estimated location of the person;
 identifying a plurality of second devices; and
 propagating, by the server, the generated one or more signals to the plurality of second devices.

10. The method of claim 9 wherein at least one second device of the plurality of second devices includes an electronic device in a home of the person.

11. The method of claim 9 wherein propagating the generated one or more signals includes pushing the one or more signals to the plurality of second devices.

12. The method of claim 9 wherein the one or more signals include a plurality of signals, and wherein different signals are propagated to different second devices.

13. The method of claim 9 wherein the plurality of first devices includes a mobile device, and the plurality of second devices includes a non-mobile device.

14. The method of claim 9 further comprising:
 accessing a location-based criterion; and
 determining whether the location-based criterion is satisfied based on the estimated location of the person,
 wherein the second data is based at least in part on whether the location-based criterion is satisfied.

15. The method of claim 14 further comprising, upon determining that the location-based criterion is satisfied, identifying a setting for at least one second device of the plurality of second devices, wherein the second data identifies the setting.

16. The method of claim 14 wherein determining whether the location-based criterion is satisfied includes determining whether the estimated location of the person is separated from a reference point by less than a threshold distance.

17. The method of claim 14 wherein at least one of the second devices includes a device configured to distribute current to a plurality of electronic devices.

18. The method of claim 9 wherein the user-input activity comprises whether user input has been recently received by the first device.

19. The method of claim 9 further comprising wherein initial user input registered the at least one of the first devices with the server, the initial user input having been received from the user prior to the receipt, at the server, of the first data collected by the at least one of the first devices.

20. A method for contributing data informative about a location of a person, the method comprising:
 identifying, at a first device, a relay server;
 receiving, at the first device, a first signal from each of one or more external devices;
 estimating, at the first device, a location of the first device based on the received signals;
 accessing, at the first device, a condition that requires that, prior to transmission of a signal to the relay server, a change in an estimated location must have occurred relative to a previous estimation of a location of the first device;
 determining, at the first device, whether the condition is satisfied;
 detecting a real-time user activity; and
 upon determining that the condition is satisfied, propagating a second signal to the identified relay server, the second signal including data indicative of the estimated location of the first device and further of the real-time user-input activity.

21. The method of claim 20 wherein determining whether the condition is satisfied includes determining whether communications of the first device are carried by a cellular tower located in a different location as compared to a cellular tower carrying communications of the first device at a time associated with the previous estimation.

22. The method of claim 20 wherein estimating the location of the first device includes estimating geographical coordinates of the first device.

23. A non-transitory computer-readable storage medium containing program instructions, which when executed by a processor cause the processor to execute a method of communicating location information, the method comprising:
 receiving a first signal from a first device, the first device being associated with a person, the first data being indicative of a real-time user-input activity;
 determining an estimated location of the first device;
 estimating a location of the person based, at least in part, on first data in the received first signal;
 determining whether a location-based criterion is met, the determination being based at least in part on the estimated location of the person;
 generating one or more second signals; and
 transmitting the one or more second signals to a plurality of second devices,
 wherein generation of the one or more second signals or transmission of the one or more second signals is based at least in part on the determination as to whether the location-based criterion is met.

24. The computer-readable storage medium of claim 23 further comprising receiving another first signal from another first device, the other first device also being associated with the person, wherein the determination of the estimated location of the person is based at least in part on the another first signal.

25. The computer-readable storage medium of claim 23 wherein the first signal includes data indicating the estimated location of the first device.

26. The computer-readable storage medium of claim 23 wherein at least one of the one or more second signals includes second data indicating the estimated location of the person.

27. The computer-readable storage medium of claim 23 further comprising identifying a setting, the identified setting being based at least in part on whether the location-based criterion is met, wherein at least one of the one or more second signals includes second data indicating the identified setting.

* * * * *